United States Patent
Chun

(10) Patent No.: US 9,916,735 B2
(45) Date of Patent: Mar. 13, 2018

(54) REMOTE GAMING CASH VOUCHER PRINTING SYSTEM

(71) Applicant: IGT, Las Vegas, NV (US)

(72) Inventor: Jay Chun, Hong Kong (HK)

(73) Assignee: IGT, Las Vegas, NV (US)

( * ) Notice: Subject to any disclaimer, the term of this patent is extended or adjusted under 35 U.S.C. 154(b) by 252 days.

(21) Appl. No.: 14/806,621

(22) Filed: Jul. 22, 2015

(65) Prior Publication Data
US 2017/0024975 A1   Jan. 26, 2017

(51) Int. Cl.
| | | |
|---|---|---|
| A63F 9/00 | (2006.01) |
| G07F 17/42 | (2006.01) |
| G07F 17/32 | (2006.01) |
| A63F 9/24 | (2006.01) |

(52) U.S. Cl.
CPC .......... *G07F 17/42* (2013.01); *A63F 9/24* (2013.01); *G07F 17/322* (2013.01); *G07F 17/3211* (2013.01); *G07F 17/3251* (2013.01)

(58) Field of Classification Search
None
See application file for complete search history.

(56) References Cited

U.S. PATENT DOCUMENTS

| | | | |
|---|---|---|---|
| 3,534,963 A | 10/1970 | Weimer |
| 3,662,105 A | 5/1972 | Parks |
| 3,708,219 A | 1/1973 | Forlini et al. |
| 3,792,437 A | 2/1974 | Blumenthal et al. |
| 3,931,504 A | 1/1976 | Jacoby |
| 3,998,309 A | 12/1976 | Mandas et al. |
| 4,004,097 A | 1/1977 | Spaulding |
| 4,071,689 A | 1/1978 | Talmage |
| 4,072,930 A | 2/1978 | Lucero |
| 4,095,795 A | 6/1978 | Saxton |
| 4,124,109 A | 11/1978 | Bissell et al. |
| 4,157,829 A | 6/1979 | Goldman et al. |
| 4,218,011 A | 8/1980 | Simjian |
| 4,261,012 A | 4/1981 | Maloomian |
| 4,283,709 A | 8/1981 | Lucero |

(Continued)

FOREIGN PATENT DOCUMENTS

| | | |
|---|---|---|
| AU | 199650576 | 4/1997 |
| EP | 0478412 | 4/1992 |

(Continued)

*Primary Examiner* — Seng H Lim
(74) *Attorney, Agent, or Firm* — Neal, Gerber & Eisenberg LLP

(57) ABSTRACT

Remote gaming cash voucher printing systems facilitate partial cash voucher payouts of cash value balances on electronic gaming terminals, such as to provide tips. Systems can include electronic gaming tables that host wager-based table games facilitated by live human dealers, cash voucher printers at the gaming tables, remotely located electronic gaming terminals that provide remote play at the electronic gaming tables, and a remote print server coupled with the gaming tables and gaming terminals. The remote print server debits a cash value of a partial monetary payout request from a gaming terminal credit balance, and routes the request from the gaming terminal to a gaming table printer for issuance of a cash voucher. The remote print server can communicate with an existing TITO server and emulate authorized TITO requests in some arrangements.

19 Claims, 11 Drawing Sheets

(56) References Cited

U.S. PATENT DOCUMENTS

| | | |
|---|---|---|
| 4,332,389 A | 6/1982 | Loyd et al. |
| 4,333,715 A | 6/1982 | Brooks |
| 4,335,809 A | 6/1982 | Wain |
| 4,337,945 A | 7/1982 | Levy |
| 4,339,709 A | 7/1982 | Brihier |
| 4,339,798 A | 7/1982 | Hedges et al. |
| 4,357,624 A | 11/1982 | Greenberg |
| 4,364,567 A | 12/1982 | Goott |
| 4,365,810 A | 12/1982 | Richardson |
| 4,373,726 A | 2/1983 | Churchill et al. |
| 4,430,728 A | 2/1984 | Beitel et al. |
| 4,448,419 A | 5/1984 | Telnaes |
| 4,454,594 A | 6/1984 | Heffron et al. |
| 4,455,025 A | 6/1984 | Itkis |
| 4,467,424 A | 8/1984 | Hedges et al. |
| 4,494,197 A | 1/1985 | Troy et al. |
| 4,503,429 A | 3/1985 | Schreiber |
| 4,517,558 A | 5/1985 | Davids |
| 4,521,014 A | 6/1985 | Sitrick |
| 4,527,798 A | 7/1985 | Siekierski et al. |
| 4,553,222 A | 11/1985 | Kurland |
| 4,582,324 A | 4/1986 | Koza et al. |
| 4,607,844 A | 8/1986 | Fullerton |
| 4,621,814 A | 11/1986 | Stepan et al. |
| 4,624,462 A | 11/1986 | Itkis |
| 4,636,951 A | 1/1987 | Harlick |
| 4,652,998 A | 3/1987 | Koza et al. |
| 4,659,182 A | 4/1987 | Aizawa |
| 4,662,635 A | 5/1987 | Enokian |
| 4,669,730 A | 6/1987 | Small |
| 4,669,731 A | 6/1987 | Clarke |
| 4,679,143 A | 7/1987 | Hagiwara |
| 4,689,742 A | 8/1987 | Troy et al. |
| 4,694,490 A | 9/1987 | Harvey et al. |
| 4,704,725 A | 11/1987 | Harvey et al. |
| 4,710,873 A | 12/1987 | Breslow et al. |
| 4,718,672 A | 1/1988 | Okada |
| 4,743,022 A | 5/1988 | Wood |
| 4,798,387 A | 1/1989 | Richardson |
| 4,805,907 A | 2/1989 | Hagiwara |
| 4,815,741 A | 3/1989 | Small |
| 4,817,951 A | 4/1989 | Crouch et al. |
| 4,842,278 A | 6/1989 | Markowicz |
| 4,848,771 A | 7/1989 | Richardson |
| 4,856,787 A | 8/1989 | Itkis |
| 4,858,932 A | 8/1989 | Keane |
| 4,880,237 A | 11/1989 | Kishishita |
| 4,882,473 A | 11/1989 | Bergeron et al. |
| 4,911,449 A | 3/1990 | Dickinson et al. |
| 4,912,548 A | 3/1990 | Shanker et al. |
| 4,926,327 A | 5/1990 | Sidley |
| 4,965,825 A | 10/1990 | Harvey et al. |
| 4,982,337 A | 1/1991 | Burr et al. |
| 4,991,848 A | 2/1991 | Greenwood et al. |
| 5,007,649 A | 4/1991 | Richardson |
| 5,038,022 A | 8/1991 | Lucero |
| 5,039,848 A | 8/1991 | Stoken |
| 5,042,809 A | 8/1991 | Richardson |
| 5,048,831 A | 9/1991 | Sides |
| 5,058,055 A | 10/1991 | Takemoto |
| 5,086,354 A | 2/1992 | Bass et al. |
| 5,092,598 A | 3/1992 | Kamille |
| 5,097,981 A | 3/1992 | Degasperi et al. |
| 5,100,139 A | 3/1992 | Di Bella |
| 5,105,184 A | 4/1992 | Pirani et al. |
| 5,113,272 A | 5/1992 | Reamey |
| 5,116,055 A | 5/1992 | Tracy |
| 5,119,295 A | 6/1992 | Kapur |
| 5,121,477 A | 6/1992 | Koopmans et al. |
| 5,132,839 A | 7/1992 | Travis |
| 5,158,293 A | 10/1992 | Mullins |
| 5,179,517 A | 1/1993 | Sarbin |
| 5,221,838 A | 6/1993 | Gutman |
| 5,223,698 A | 6/1993 | Kapur |
| 5,233,423 A | 8/1993 | Jernigan et al. |
| 5,248,142 A | 9/1993 | Breeding |
| 5,265,874 A | 11/1993 | Dickinson et al. |
| 5,275,400 A | 1/1994 | Weingardt et al. |
| 5,276,312 A | 1/1994 | McCarthy |
| 5,282,620 A | 2/1994 | Keesee |
| 5,288,081 A | 2/1994 | Breeding |
| 5,290,033 A | 3/1994 | Bittner et al. |
| 5,297,802 A | 3/1994 | Pocock et al. |
| 5,319,491 A | 6/1994 | Selbrede |
| 5,324,035 A | 6/1994 | Morris et al. |
| 5,325,830 A | 7/1994 | Hammer |
| 5,326,104 A | 7/1994 | Pease et al. |
| 5,342,047 A | 8/1994 | Heidel et al. |
| 5,348,299 A | 9/1994 | Clapper, Jr. |
| 5,351,970 A | 10/1994 | Fioretti |
| 5,364,100 A | 11/1994 | Ludlow et al. |
| 5,371,345 A | 12/1994 | LeStrange |
| 5,376,587 A | 12/1994 | Buchmann et al. |
| 5,377,975 A | 1/1995 | Clapper, Jr. |
| 5,393,057 A | 2/1995 | Marnell, II |
| 5,393,061 A | 2/1995 | Manship et al. |
| 5,397,125 A | 3/1995 | Adams |
| 5,398,932 A | 3/1995 | Eberhardt et al. |
| 5,407,199 A | 4/1995 | Gumina |
| 5,408,417 A | 4/1995 | Wilder |
| 5,429,361 A | 7/1995 | Raven et al. |
| 5,456,465 A | 10/1995 | Durham |
| 5,457,306 A | 10/1995 | Lucero |
| 5,467,893 A | 11/1995 | Landis et al. |
| 5,470,079 A | 11/1995 | LeStrange et al. |
| 5,472,194 A | 12/1995 | Breeding et al. |
| 5,476,259 A | 12/1995 | Weingardt |
| 5,477,952 A | 12/1995 | Castellano et al. |
| 5,483,049 A | 1/1996 | Schulze, Jr. |
| 5,487,544 A | 1/1996 | Clapper, Jr. |
| 5,489,096 A | 2/1996 | Aron |
| 5,490,670 A | 2/1996 | Hobert |
| 5,494,296 A | 2/1996 | Grassa |
| 5,502,636 A | 3/1996 | Clarke |
| 5,505,449 A | 4/1996 | Eberhardt et al. |
| 5,531,441 A | 7/1996 | Dabrowski et al. |
| 5,536,008 A | 7/1996 | Clapper, Jr. |
| 5,539,547 A | 7/1996 | Ishii et al. |
| 5,542,669 A | 8/1996 | Charron et al. |
| 5,544,892 A | 8/1996 | Breeding |
| 5,547,192 A | 8/1996 | Ishibashi |
| 5,553,864 A | 9/1996 | Sitrick |
| 5,559,312 A | 9/1996 | Lucero |
| 5,562,284 A | 10/1996 | Stevens |
| 5,564,700 A | 10/1996 | Celona |
| 5,564,701 A | 10/1996 | Dettor |
| 5,580,055 A | 12/1996 | Hagiwara |
| 5,580,309 A | 12/1996 | Piechowiak et al. |
| 5,580,310 A | 12/1996 | Orus et al. |
| 5,580,311 A | 12/1996 | Haste, III |
| 5,585,821 A | 12/1996 | Ishikura et al. |
| 5,586,936 A | 12/1996 | Bennett et al. |
| 5,586,937 A | 12/1996 | Menashe |
| 5,588,650 A | 12/1996 | Eman et al. |
| 5,588,913 A | 12/1996 | Hecht |
| 5,589,980 A | 12/1996 | Bass et al. |
| 5,595,538 A | 1/1997 | Haste, III |
| 5,609,337 A | 3/1997 | Clapper, Jr. |
| 5,611,730 A | 3/1997 | Weiss |
| 5,613,679 A | 3/1997 | Casa et al. |
| 5,613,909 A | 3/1997 | Stelovsky |
| 5,613,912 A | 3/1997 | Slater |
| 5,618,045 A | 4/1997 | Kagan |
| 5,618,232 A | 4/1997 | Martin |
| 5,619,649 A | 4/1997 | Kovnat et al. |
| 5,621,812 A | 4/1997 | Deaton et al. |
| 5,628,684 A | 5/1997 | Bouedec |
| 5,630,754 A | 5/1997 | Rebane |
| 5,642,485 A | 6/1997 | Deaton et al. |
| 5,643,086 A | 7/1997 | Alcorn et al. |
| 5,645,485 A | 7/1997 | Clapper, Jr. |
| 5,647,592 A | 7/1997 | Gerow |
| 5,655,961 A | 8/1997 | Acres et al. |
| 5,657,899 A | 8/1997 | Stoken |

(56) References Cited

U.S. PATENT DOCUMENTS

| | | |
|---|---|---|
| 5,674,128 A | 10/1997 | Holch et al. |
| 5,676,231 A | 10/1997 | Legras |
| 5,678,679 A | 10/1997 | Berman |
| 5,697,843 A | 12/1997 | Manship et al. |
| 5,702,304 A | 12/1997 | Acres |
| 5,709,603 A | 1/1998 | Kaye |
| 5,718,632 A | 2/1998 | Hayashi |
| 5,720,483 A | 2/1998 | Trinh |
| 5,722,890 A | 3/1998 | Libby et al. |
| 5,735,432 A | 4/1998 | Stoken et al. |
| 5,740,549 A | 4/1998 | Reilly et al. |
| 5,741,183 A | 4/1998 | Acres |
| 5,743,523 A | 4/1998 | Kelly et al. |
| 5,743,798 A | 4/1998 | Adams et al. |
| 5,745,197 A | 4/1998 | Leung et al. |
| 5,749,784 A | 5/1998 | Clapper, Jr. |
| 5,752,881 A | 5/1998 | Inoue |
| 5,752,882 A | 5/1998 | Acres et al. |
| 5,759,102 A | 6/1998 | Pease |
| 5,759,103 A | 6/1998 | Freels et al. |
| 5,761,647 A | 6/1998 | Boushy |
| 5,762,552 A | 6/1998 | Vuong et al. |
| 5,764,317 A | 6/1998 | Sadovnik et al. |
| 5,766,076 A | 6/1998 | Pease et al. |
| 5,768,382 A | 6/1998 | Schneier |
| 5,769,716 A | 6/1998 | Saffari |
| 5,770,533 A | 6/1998 | Franchi |
| 5,772,509 A | 6/1998 | Weiss |
| 5,774,873 A | 6/1998 | Berent et al. |
| RE35,864 E | 7/1998 | Weingardt |
| 5,779,545 A | 7/1998 | Berg et al. |
| 5,779,547 A | 7/1998 | SoRelle et al. |
| 5,782,692 A | 7/1998 | Stelovsky |
| 5,785,592 A | 7/1998 | Jacobsen |
| 5,785,594 A | 7/1998 | Seibert et al. |
| 5,788,573 A | 8/1998 | Baerlocher et al. |
| 5,788,574 A | 8/1998 | Ornstein et al. |
| 5,791,992 A | 8/1998 | Crump et al. |
| 5,795,225 A | 8/1998 | Jones et al. |
| 5,795,228 A | 8/1998 | Trumbull |
| 5,796,389 A | 8/1998 | Bertram |
| 5,797,085 A | 8/1998 | Beuk |
| 5,797,795 A | 8/1998 | Takemoto et al. |
| 5,800,268 A | 9/1998 | Molnick |
| 5,800,269 A | 9/1998 | Holch et al. |
| 5,803,451 A | 9/1998 | Kelly et al. |
| 5,809,482 A | 9/1998 | Strisower |
| 5,810,664 A | 9/1998 | Clapper, Jr. |
| 5,811,772 A | 9/1998 | Lucero |
| 5,813,912 A | 9/1998 | Shultz |
| 5,816,918 A | 10/1998 | Kelly et al. |
| 5,818,019 A | 10/1998 | Irwin, Jr. |
| 5,820,459 A | 10/1998 | Acres et al. |
| 5,820,461 A | 10/1998 | Pernatozzi |
| 5,830,065 A | 11/1998 | Sitrick |
| 5,830,067 A | 11/1998 | Graves et al. |
| 5,833,536 A | 11/1998 | Davids |
| 5,833,540 A | 11/1998 | Miodunski et al. |
| 5,836,817 A | 11/1998 | Acres et al. |
| 5,836,819 A | 11/1998 | Ugawa |
| 5,839,730 A | 11/1998 | Pike |
| 5,839,731 A | 11/1998 | Feola |
| 5,851,148 A | 12/1998 | Brune |
| 5,851,149 A | 12/1998 | Xidos et al. |
| 5,855,515 A | 1/1999 | Pease et al. |
| 5,871,398 A | 2/1999 | Schneier et al. |
| 5,873,781 A | 2/1999 | Keane |
| D406,612 S | 3/1999 | Johnson |
| 5,876,283 A | 3/1999 | Parra et al. |
| 5,882,260 A | 3/1999 | Marks et al. |
| 5,885,085 A | 3/1999 | Fujita |
| 5,885,158 A | 3/1999 | Torango et al. |
| 5,887,243 A | 3/1999 | Harvey et al. |
| 5,888,136 A | 3/1999 | Herbert |
| 5,907,321 A | 5/1999 | Grossman et al. |
| 5,910,046 A | 6/1999 | Wada et al. |
| 5,911,626 A | 6/1999 | McCrea, Jr. |
| 5,915,588 A | 6/1999 | Stoken et al. |
| 5,919,090 A | 7/1999 | Mothwurf |
| 5,919,091 A | 7/1999 | Bell |
| 5,928,082 A | 7/1999 | Clapper, Jr. |
| 5,931,471 A | 8/1999 | Bonito |
| 5,934,671 A | 8/1999 | Harrison |
| 5,941,771 A | 8/1999 | Haste, III |
| 5,941,772 A | 8/1999 | Paige |
| 5,941,773 A | 8/1999 | Harlick |
| 5,944,606 A | 8/1999 | Gerow |
| 5,949,042 A | 9/1999 | Dietz, II et al. |
| 5,951,397 A | 9/1999 | Dickinson |
| 5,952,640 A | 9/1999 | Lucero |
| 5,954,582 A | 9/1999 | Zach |
| 5,954,583 A | 9/1999 | Green |
| 5,956,180 A | 9/1999 | Bass et al. |
| 5,957,776 A | 9/1999 | Hoehne |
| 5,959,277 A | 9/1999 | Lucero |
| 5,964,660 A | 10/1999 | James et al. |
| 5,967,893 A | 10/1999 | Lawrence et al. |
| 5,967,896 A | 10/1999 | Jorasch |
| 5,970,143 A | 10/1999 | Schneier et al. |
| 5,971,271 A | 10/1999 | Wynn et al. |
| 5,980,384 A | 11/1999 | Barrie |
| 5,980,385 A | 11/1999 | Clapper, Jr. |
| 5,984,779 A | 11/1999 | Bridgeman et al. |
| 5,990,927 A | 11/1999 | Hendricks et al. |
| 5,999,808 A | 12/1999 | LaDue |
| 6,001,016 A | 12/1999 | Walker et al. |
| 6,003,013 A | 12/1999 | Boushy et al. |
| 6,003,651 A | 12/1999 | Waller |
| 6,010,404 A | 1/2000 | Walker |
| 6,012,832 A | 1/2000 | Saunders et al. |
| 6,012,982 A | 1/2000 | Piechowiak et al. |
| 6,012,983 A | 1/2000 | Walker |
| 6,012,984 A | 1/2000 | Roseman |
| 6,015,344 A | 1/2000 | Kelly et al. |
| 6,015,346 A | 1/2000 | Bennett |
| 6,017,032 A | 1/2000 | Grippo et al. |
| 6,019,283 A | 2/2000 | Lucero |
| 6,019,374 A | 2/2000 | Breeding |
| 6,024,640 A | 2/2000 | Walker et al. |
| 6,027,115 A | 2/2000 | Griswold et al. |
| 6,038,666 A | 3/2000 | Hsu |
| 6,039,650 A | 3/2000 | Hill |
| 6,048,269 A | 4/2000 | Burns et al. |
| 6,049,823 A | 4/2000 | Hwang |
| 6,050,895 A | 4/2000 | Luciano et al. |
| 6,054,969 A | 4/2000 | Haisma |
| 6,056,289 A | 5/2000 | Clapper, Jr. |
| 6,056,641 A | 5/2000 | Webb |
| 6,059,289 A | 5/2000 | Vancura |
| 6,059,658 A | 5/2000 | Mangano et al. |
| 6,062,981 A | 5/2000 | Luciano, Jr. |
| 6,068,552 A | 5/2000 | Walker et al. |
| 6,077,163 A | 6/2000 | Walker |
| 6,078,338 A | 6/2000 | Horan et al. |
| 6,079,711 A | 6/2000 | Wei et al. |
| 6,080,063 A | 6/2000 | Khosla |
| 6,083,105 A | 7/2000 | Ronin et al. |
| 6,089,975 A | 7/2000 | Dunn |
| 6,089,982 A | 7/2000 | Holch et al. |
| 6,093,100 A | 7/2000 | Singer et al. |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker |
| 6,113,098 A | 9/2000 | Adams |
| 6,113,492 A | 9/2000 | Walker |
| 6,113,493 A | 9/2000 | Walker et al. |
| 6,113,495 A | 9/2000 | Walker et al. |
| 6,117,009 A | 9/2000 | Yoseloff |
| 6,120,024 A | 9/2000 | Lind |
| 6,135,884 A | 10/2000 | Hedrick et al. |
| 6,135,887 A | 10/2000 | Pease |
| 6,139,431 A | 10/2000 | Walker |
| 6,141,711 A | 10/2000 | Shah |

(56) References Cited

U.S. PATENT DOCUMENTS

| | | |
|---|---|---|
| 6,142,369 A | 11/2000 | Jonstromer |
| 6,142,876 A | 11/2000 | Cumbers |
| 6,146,272 A | 11/2000 | Walker et al. |
| 6,149,522 A | 11/2000 | Alcorn et al. |
| 6,155,925 A | 12/2000 | Giobbi et al. |
| 6,159,095 A | 12/2000 | Frohm et al. |
| 6,159,098 A | 12/2000 | Slomiany et al. |
| 6,161,059 A | 12/2000 | Tedesco |
| 6,162,121 A | 12/2000 | Morro et al. |
| 6,162,122 A | 12/2000 | Acres |
| 6,165,069 A | 12/2000 | Sines et al. |
| 6,168,521 B1 | 1/2001 | Luciano et al. |
| 6,168,523 B1 | 1/2001 | Piechowiak et al. |
| 6,174,233 B1 | 1/2001 | Sunaga et al. |
| 6,174,234 B1 | 1/2001 | Seibert, Jr. |
| 6,175,358 B1 | 1/2001 | Scott-Jackson et al. |
| 6,182,221 B1 | 1/2001 | Hsu |
| 6,183,361 B1 | 2/2001 | Cummings et al. |
| 6,183,362 B1 | 2/2001 | Boushy |
| 6,186,893 B1 | 2/2001 | Walker et al. |
| 6,190,256 B1 | 2/2001 | Walker et al. |
| 6,193,608 B1 | 2/2001 | Walker et al. |
| 6,203,428 B1 | 3/2001 | Giobbi et al. |
| 6,206,283 B1 | 3/2001 | Bansal |
| 6,210,275 B1 | 4/2001 | Olsen |
| 6,210,276 B1 | 4/2001 | Mullins |
| 6,210,279 B1 | 4/2001 | Dickinson |
| 6,213,875 B1 | 4/2001 | Suzuki |
| 6,217,448 B1 | 4/2001 | Olsen |
| 6,220,961 B1 | 4/2001 | Keane et al. |
| 6,223,166 B1 | 4/2001 | Kay |
| 6,227,972 B1 | 5/2001 | Walker |
| 6,231,445 B1 | 5/2001 | Acres |
| 6,234,900 B1 | 5/2001 | Cumbers |
| 6,241,606 B1 | 6/2001 | Riendeau et al. |
| 6,244,596 B1 | 6/2001 | Kondratjuk |
| 6,244,957 B1 | 6/2001 | Walker et al. |
| 6,244,958 B1 | 6/2001 | Acres |
| 6,247,643 B1 | 6/2001 | Lucero |
| 6,250,685 B1 | 6/2001 | Walker et al. |
| 6,251,014 B1 | 6/2001 | Stockdale et al. |
| 6,252,707 B1 | 6/2001 | Kleinberger et al. |
| 6,253,119 B1 | 6/2001 | Dabrowski |
| 6,253,374 B1 | 6/2001 | Dresevic et al. |
| 6,254,480 B1 | 7/2001 | Zach |
| 6,254,481 B1 | 7/2001 | Jaffe |
| 6,263,258 B1 | 7/2001 | Dabrowski |
| 6,264,560 B1 | 7/2001 | Goldberg et al. |
| 6,264,561 B1 | 7/2001 | Saffari |
| 6,267,671 B1 | 7/2001 | Hogan |
| 6,270,410 B1 | 8/2001 | Demar |
| 6,273,820 B1 | 8/2001 | Haste, III |
| 6,280,318 B1 | 8/2001 | Criss-Puszkiewicz |
| 6,280,325 B1 | 8/2001 | Fisk |
| 6,280,326 B1 | 8/2001 | Saunders |
| 6,280,328 B1 | 8/2001 | Holch et al. |
| 6,285,868 B1 | 9/2001 | LaDue |
| 6,293,866 B1 | 9/2001 | Walker |
| 6,302,790 B1 | 10/2001 | Brossard |
| 6,302,791 B1 | 10/2001 | Frohm et al. |
| 6,302,793 B1 | 10/2001 | Fertitta, III et al. |
| 6,306,038 B1 | 10/2001 | Graves et al. |
| 6,307,956 B1 | 10/2001 | Black |
| 6,309,298 B1 | 10/2001 | Gerow |
| 6,312,332 B1 | 11/2001 | Walker et al. |
| 6,312,334 B1 | 11/2001 | Yoseloff |
| 6,315,289 B1 | 11/2001 | Sakamoto et al. |
| 6,315,666 B1 | 11/2001 | Mastera et al. |
| 6,319,125 B1 | 11/2001 | Acres |
| 6,325,716 B1 | 12/2001 | Walker et al. |
| 6,334,614 B1 | 1/2002 | Breeding |
| 6,336,857 B1 | 1/2002 | McBride |
| 6,336,863 B1 | 1/2002 | Baerlocher et al. |
| 6,337,513 B1 | 1/2002 | Clevenger et al. |
| 6,341,353 B1 | 1/2002 | Herman |
| 6,343,989 B1 | 2/2002 | Wood et al. |
| 6,347,996 B1 | 2/2002 | Gilmore et al. |
| 6,358,150 B1 | 3/2002 | Mir et al. |
| 6,358,151 B1 | 3/2002 | Enzminger et al. |
| 6,364,768 B1 | 4/2002 | Acres et al. |
| 6,368,216 B1 | 4/2002 | Hedrick et al. |
| 6,368,218 B2 | 4/2002 | Angell, Jr. |
| 6,371,852 B1 | 4/2002 | Acres |
| 6,375,567 B1 | 4/2002 | Acres |
| 6,378,073 B1 | 4/2002 | Davis |
| 6,379,244 B1 | 4/2002 | Sagawa et al. |
| 6,379,246 B1 | 4/2002 | Debrowski |
| 6,379,247 B1 | 4/2002 | Walker et al. |
| 6,383,076 B1 | 5/2002 | Tiedeken |
| 6,386,977 B1 | 5/2002 | Hole |
| 6,390,473 B1 | 5/2002 | Vancura et al. |
| 6,390,917 B1 | 5/2002 | Walker et al. |
| 6,394,907 B1 | 5/2002 | Rowe |
| 6,398,220 B1 | 6/2002 | Inoue |
| 6,402,614 B1 | 6/2002 | Schneier et al. |
| 6,409,595 B1 | 6/2002 | Uihlein |
| 6,409,602 B1 | 6/2002 | Wiltshire |
| 6,416,406 B1 | 7/2002 | Duhamel |
| 6,416,827 B1 | 7/2002 | Chakrapani et al. |
| 6,419,583 B1 | 7/2002 | Crumby et al. |
| 6,425,825 B1 | 7/2002 | Sitrick |
| 6,435,511 B1 | 8/2002 | Vancura et al. |
| 6,435,970 B1 | 8/2002 | Baerlocher et al. |
| 6,443,456 B1 | 9/2002 | Gajor |
| 6,443,837 B1 | 9/2002 | Jaffe et al. |
| 6,443,843 B1 | 9/2002 | Walker |
| 6,444,496 B1 | 9/2002 | Edwards et al. |
| 6,445,185 B1 | 9/2002 | Damadian et al. |
| 6,446,257 B1 | 9/2002 | Pradhan et al. |
| 6,447,395 B1 | 9/2002 | Stevens |
| 6,449,687 B1 | 9/2002 | Moriya |
| 6,450,885 B2 | 9/2002 | Schneier et al. |
| 6,453,319 B1 | 9/2002 | Mattis et al. |
| 6,454,648 B1 | 9/2002 | Kelly et al. |
| 6,454,649 B1 | 9/2002 | Mattice et al. |
| RE37,885 E | 10/2002 | Acres et al. |
| 6,459,440 B1 | 10/2002 | Monnes et al. |
| 6,460,848 B1 | 10/2002 | Soltys et al. |
| 6,471,591 B1 | 10/2002 | Crumby |
| 6,475,086 B2 | 11/2002 | Zach |
| 6,488,585 B1 | 12/2002 | Wells |
| 6,491,583 B1 | 12/2002 | Gauselmann |
| 6,496,928 B1 | 12/2002 | Deo |
| 6,500,067 B1 | 12/2002 | Luciano et al. |
| 6,503,147 B1 | 1/2003 | Stockdale et al. |
| 6,508,709 B1 | 1/2003 | Karmarkar |
| 6,508,710 B1 | 1/2003 | Paravia et al. |
| 6,508,711 B1 | 1/2003 | Ono |
| 6,511,375 B1 | 1/2003 | Kaminkow |
| 6,512,559 B1 | 1/2003 | Hashimoto et al. |
| 6,514,141 B1 | 2/2003 | Kaminkow et al. |
| 6,517,073 B1 | 2/2003 | Vancura |
| 6,517,433 B2 | 2/2003 | Loose et al. |
| 6,517,435 B2 | 2/2003 | Soltys et al. |
| 6,517,436 B2 | 2/2003 | Soltys et al. |
| 6,517,437 B1 | 2/2003 | Wells et al. |
| 6,520,857 B2 | 2/2003 | Soltys et al. |
| 6,524,184 B1 | 2/2003 | Lind et al. |
| 6,524,185 B2 | 2/2003 | Lind |
| 6,527,271 B2 | 3/2003 | Soltys et al. |
| 6,527,638 B1 | 3/2003 | Walker et al. |
| 6,530,835 B2 | 3/2003 | Walker |
| 6,530,836 B2 | 3/2003 | Soltys et al. |
| 6,530,837 B2 | 3/2003 | Soltys et al. |
| 6,533,276 B2 | 3/2003 | Soltys et al. |
| 6,533,662 B2 | 3/2003 | Soltys et al. |
| 6,533,664 B1 | 3/2003 | Crumby |
| 6,537,150 B1 | 3/2003 | Luciano et al. |
| 6,540,609 B1 | 4/2003 | Paige |
| 6,547,664 B2 | 4/2003 | Saunders |
| 6,554,283 B2 | 4/2003 | Vancura et al. |
| 6,554,704 B2 | 4/2003 | Nicastro et al. |
| 6,561,903 B2 | 5/2003 | Walker |
| 6,569,015 B1 | 5/2003 | Baerlocher et al. |

(56) References Cited

U.S. PATENT DOCUMENTS

| | | |
|---|---|---|
| 6,569,017 B2 | 5/2003 | Enzminger et al. |
| 6,575,541 B1 | 6/2003 | Hedrick et al. |
| 6,575,834 B1 | 6/2003 | Lindo |
| 6,579,179 B2 | 6/2003 | Poole et al. |
| 6,579,180 B2 | 6/2003 | Soltys et al. |
| 6,579,181 B2 | 6/2003 | Soltys et al. |
| 6,581,161 B1 | 6/2003 | Byford |
| 6,582,310 B1 | 6/2003 | Walker et al. |
| 6,585,589 B2 | 7/2003 | Okuniewicz |
| 6,585,591 B1 | 7/2003 | Baerlocher et al. |
| 6,585,598 B2 | 7/2003 | Nguyen |
| 6,592,456 B2 | 7/2003 | Walker et al. |
| 6,595,857 B2 | 7/2003 | Soltys et al. |
| 6,598,788 B1 | 7/2003 | Dabrowski |
| 6,599,187 B2 | 7/2003 | Gerow |
| 6,599,193 B2 | 7/2003 | Baerlocher et al. |
| 6,607,195 B2 | 8/2003 | Vancura |
| 6,620,046 B2 | 9/2003 | Rowe |
| 6,628,939 B2 | 9/2003 | Paulsen |
| D480,961 S | 10/2003 | Deadman |
| 6,634,550 B1 | 10/2003 | Walker |
| 6,638,163 B2 | 10/2003 | Moody |
| 6,641,483 B1 | 11/2003 | Luciano |
| 6,645,068 B1 | 11/2003 | Kelly et al. |
| 6,646,695 B1 | 11/2003 | Gauselmann |
| 6,648,757 B1 | 11/2003 | Slomiany et al. |
| 6,648,761 B1 | 11/2003 | Izawa |
| 6,652,378 B2 | 11/2003 | Cannon et al. |
| 6,652,380 B1 | 11/2003 | Luciano |
| 6,656,040 B1 | 12/2003 | Brosnan et al. |
| 6,656,044 B1 | 12/2003 | Lewis |
| 6,659,864 B2 | 12/2003 | McGahn et al. |
| 6,661,425 B1 | 12/2003 | Hiroaki |
| 6,663,490 B2 | 12/2003 | Soltys et al. |
| 6,672,589 B1 | 1/2004 | Lemke et al. |
| 6,676,515 B1 | 1/2004 | Baltz et al. |
| 6,676,517 B2 | 1/2004 | Beavers |
| 6,676,522 B2 | 1/2004 | Rowe |
| 6,679,775 B1 | 1/2004 | Luciano et al. |
| 6,682,421 B1 | 1/2004 | Rowe |
| 6,682,423 B2 | 1/2004 | Brosnan et al. |
| 6,685,559 B2 | 2/2004 | Luciano et al. |
| 6,685,567 B2 | 2/2004 | Cockerille et al. |
| 6,692,005 B2 | 2/2004 | Vancura et al. |
| 6,695,703 B1 | 2/2004 | McGahn |
| 6,702,670 B2 | 3/2004 | Jasper |
| 6,702,675 B2 | 3/2004 | Poole et al. |
| 6,712,694 B1 | 3/2004 | Nordman |
| 6,712,696 B2 | 3/2004 | Soltys et al. |
| 6,712,698 B2 | 3/2004 | Paulsen et al. |
| 6,715,756 B2 | 4/2004 | Inoue |
| 6,717,728 B2 | 4/2004 | Putilin |
| 6,722,978 B2 | 4/2004 | Valenti |
| 6,722,979 B2 | 4/2004 | Gilmore et al. |
| 6,726,563 B1 | 4/2004 | Baerlocher et al. |
| 6,726,565 B2 | 4/2004 | Hughs-Baird |
| 6,729,956 B2 | 5/2004 | Wolf et al. |
| 6,729,961 B1 | 5/2004 | Millerschone |
| 6,739,975 B2 | 5/2004 | Nguyen |
| 6,743,095 B2 | 6/2004 | Cole et al. |
| 6,749,500 B1 | 6/2004 | Nelson et al. |
| 6,749,510 B2 | 6/2004 | Giobbi |
| 6,758,393 B1 | 7/2004 | Luciano |
| 6,758,751 B2 | 7/2004 | Soltys et al. |
| 6,769,984 B2 | 8/2004 | Duhamel et al. |
| 6,786,819 B2 | 9/2004 | Baerlocher et al. |
| 6,789,801 B2 | 9/2004 | Snow |
| 6,800,029 B2 | 10/2004 | Rowe et al. |
| 6,802,777 B2 | 10/2004 | Seelig et al. |
| 6,804,763 B1 | 10/2004 | Stockdale et al. |
| 6,817,945 B2 | 11/2004 | Seelig et al. |
| 6,817,946 B2 | 11/2004 | Motegi et al. |
| 6,843,723 B2 | 1/2005 | Joshi |
| 6,846,238 B2 | 1/2005 | Wells |
| 6,848,995 B1 | 2/2005 | Walker et al. |
| 6,852,029 B2 | 2/2005 | Baltz et al. |
| 6,863,608 B1 | 3/2005 | LeMay et al. |
| 6,863,611 B1 | 3/2005 | Morrow et al. |
| 6,866,586 B2 | 3/2005 | Oberberger et al. |
| 6,869,362 B2 | 3/2005 | Walker |
| 6,880,079 B2 | 4/2005 | Kefford |
| 6,884,174 B2 | 4/2005 | Lundy et al. |
| 6,887,157 B2 | 5/2005 | LeMay et al. |
| 6,890,256 B2 | 5/2005 | Walker et al. |
| 6,890,259 B2 | 5/2005 | Breckner et al. |
| 6,896,618 B2 | 5/2005 | Benoy et al. |
| 6,905,411 B2 | 6/2005 | Nguyen |
| 6,906,762 B1 | 6/2005 | Witehira et al. |
| 6,908,384 B1 | 6/2005 | Luciano, Jr. |
| 6,913,534 B2 | 7/2005 | Defrees-Parrott et al. |
| 6,916,246 B1 | 7/2005 | Luciano, Jr. |
| 6,924,903 B2 | 8/2005 | Brooks et al. |
| 6,935,946 B2 | 8/2005 | Yoseloff |
| 6,937,298 B2 | 8/2005 | Okada |
| 6,942,574 B1 | 9/2005 | LeMay et al. |
| RE38,812 E | 10/2005 | Acres et al. |
| 6,958,014 B1 | 10/2005 | Luciano, Jr. et al. |
| 6,960,132 B2 | 11/2005 | Baerlocher et al. |
| 6,966,834 B1 | 11/2005 | Johnson |
| 6,969,319 B2 | 11/2005 | Rowe |
| 6,984,174 B2 | 1/2006 | Cannon et al. |
| 6,991,543 B2 | 1/2006 | Joshi |
| 6,997,803 B2 | 2/2006 | LeMay et al. |
| 7,000,921 B2 | 2/2006 | Schultz |
| 7,001,278 B2 | 2/2006 | Maya et al. |
| 7,004,388 B2 | 2/2006 | Kohta |
| 7,004,837 B1 | 2/2006 | Crowder, Jr. et al. |
| 7,008,320 B2 | 3/2006 | Rowe et al. |
| 7,022,017 B1 | 4/2006 | Halbritter et al. |
| 7,025,676 B2 | 4/2006 | Cole et al. |
| 7,029,395 B1 | 4/2006 | Baerlocher |
| 7,048,628 B2 | 5/2006 | Schneider |
| 7,056,215 B1 | 6/2006 | Olive |
| 7,063,617 B2 | 6/2006 | Brosnan et al. |
| 7,070,501 B2 | 7/2006 | Cormack et al. |
| 7,070,503 B2 | 7/2006 | Rudolph |
| 7,094,149 B2 | 8/2006 | Walker et al. |
| 7,111,845 B2 | 9/2006 | Walker et al. |
| 7,112,138 B2 | 9/2006 | Hedrick et al. |
| 7,118,478 B2 | 10/2006 | Fayter et al. |
| 7,128,647 B2 | 10/2006 | Muir |
| 7,137,889 B1 | 11/2006 | Luciano |
| 7,137,892 B2 | 11/2006 | Sitrick |
| 7,144,321 B2 | 12/2006 | Mayeroff |
| 7,153,210 B2 | 12/2006 | Yamagishi |
| 7,167,724 B2 | 1/2007 | Yamagishi |
| 7,204,753 B2 | 4/2007 | Ozaki et al. |
| 7,220,181 B2 | 5/2007 | Okada |
| 7,223,172 B2 | 5/2007 | Baerlocher et al. |
| 7,241,219 B2 | 7/2007 | Walker et al. |
| 7,252,288 B2 | 8/2007 | Seelig et al. |
| 7,255,351 B2 | 8/2007 | Yoseloff et al. |
| 7,255,643 B2 | 8/2007 | Ozaki et al. |
| 7,275,991 B2 | 10/2007 | Burns |
| 7,285,049 B1 | 10/2007 | Luciano, Jr. et al. |
| 7,290,072 B2 | 10/2007 | Quraishi et al. |
| 7,291,066 B2 | 11/2007 | Gauselmann |
| 7,297,062 B2 | 11/2007 | Gatto et al. |
| 7,303,473 B2 | 12/2007 | Rowe |
| 7,309,284 B2 | 12/2007 | Griswold et al. |
| 7,322,884 B2 | 1/2008 | Emoii et al. |
| 7,322,885 B1 | 1/2008 | Luciano, Jr. et al. |
| 7,326,115 B2 | 2/2008 | Baerlocher |
| 7,329,179 B2 | 2/2008 | Baerlocher |
| 7,329,181 B2 | 2/2008 | Hoshino et al. |
| 7,331,520 B2 | 2/2008 | Silva |
| 7,335,106 B2 | 2/2008 | Johnson |
| 7,337,330 B2 | 2/2008 | Gatto |
| 7,341,522 B2 | 3/2008 | Yamagishi |
| 7,351,146 B2 | 4/2008 | Kaminkow |
| 7,357,714 B2 | 4/2008 | Tessmer et al. |
| 7,387,570 B2 | 6/2008 | Randall |
| 7,392,470 B2 | 6/2008 | Kammler |
| 7,416,485 B2 | 8/2008 | Walker et al. |

(56) References Cited

U.S. PATENT DOCUMENTS

| | | |
|---|---|---|
| 7,419,428 B2 | 9/2008 | Rowe |
| 7,452,270 B2 | 11/2008 | Walker et al. |
| 7,465,227 B2 | 12/2008 | Baerlocher |
| 7,467,999 B2 | 12/2008 | Walker et al. |
| 7,470,185 B2 | 12/2008 | Baerlocher |
| 7,473,179 B2 | 1/2009 | Xidos et al. |
| 7,477,889 B2 | 1/2009 | Kim |
| 7,488,251 B2 | 2/2009 | Kaminkow |
| 7,503,849 B2 | 3/2009 | Hornik et al. |
| 7,510,474 B2 | 3/2009 | Carter, Sr. |
| 7,520,810 B2 | 4/2009 | Dabrowski |
| 7,537,456 B2 | 5/2009 | Snow |
| 7,545,522 B1 | 6/2009 | Lou |
| 7,546,947 B1 | 6/2009 | Arias |
| 7,552,341 B2 | 6/2009 | Chen |
| 7,566,274 B2 | 7/2009 | Johnson et al. |
| 7,575,512 B2 | 8/2009 | Kennedy |
| 7,591,726 B2 | 9/2009 | Baerlocher et al. |
| 7,594,855 B2 | 9/2009 | Meyerhofer |
| 7,611,409 B2 | 11/2009 | Muir |
| 7,618,319 B2 | 11/2009 | Casey et al. |
| 7,644,861 B2 | 1/2010 | Alderucci |
| 7,666,086 B2 | 2/2010 | Baerlocher |
| 7,666,087 B2 | 2/2010 | Hughs-Baird |
| 7,674,177 B2 | 3/2010 | Cole |
| 7,674,180 B2 | 3/2010 | Graham et al. |
| 7,686,687 B2 | 3/2010 | Cannon et al. |
| 7,693,306 B2 | 4/2010 | Huber |
| 7,695,366 B1 | 4/2010 | Holch |
| 7,699,698 B2 | 4/2010 | Randall |
| 7,699,703 B2 | 4/2010 | Muir |
| 7,704,147 B2 | 4/2010 | Quraishi et al. |
| 7,753,789 B2 | 7/2010 | Walker et al. |
| 7,753,798 B2 | 7/2010 | Soltys et al. |
| 7,758,419 B2 | 7/2010 | Rowe et al. |
| 7,758,420 B2 | 7/2010 | Saffari |
| 7,771,271 B2 | 8/2010 | Walker et al. |
| 7,775,524 B2 | 8/2010 | Lutnick et al. |
| 7,780,529 B2 | 8/2010 | Rowe et al. |
| 7,785,193 B2 | 8/2010 | Paulsen |
| 7,789,743 B2 | 9/2010 | Walker et al. |
| 7,819,744 B2 | 10/2010 | Hughs-Baird |
| 7,819,750 B2 | 10/2010 | Lam et al. |
| 7,822,641 B2 | 10/2010 | Abbott et al. |
| 7,827,488 B2 | 11/2010 | Sitrick |
| 7,828,643 B2 | 11/2010 | Baerlocher |
| 7,837,547 B2 | 11/2010 | Cannon |
| 7,846,017 B2 | 12/2010 | Walker et al. |
| 7,846,018 B2 | 12/2010 | Baerlocher |
| 7,850,522 B2 | 12/2010 | Walker et al. |
| 7,867,077 B2 | 1/2011 | Baerlocher et al. |
| 7,867,086 B2 | 1/2011 | Sitrick |
| 7,878,892 B2 | 2/2011 | Sines et al. |
| 7,883,417 B2 | 2/2011 | Bruzzese |
| 7,905,771 B2 | 3/2011 | Walker et al. |
| 7,905,774 B2 | 3/2011 | Walker et al. |
| 7,914,372 B2 | 3/2011 | Tessmer et al. |
| 7,931,531 B2 | 4/2011 | Oberberger |
| 7,950,993 B2 | 5/2011 | Oberberger |
| 7,950,996 B2 | 5/2011 | Nguyen |
| 7,963,845 B2 | 6/2011 | Baerlocher |
| 7,967,674 B2 | 6/2011 | Baerlocher |
| 7,976,378 B2 | 7/2011 | Baerlocher |
| 7,980,948 B2 | 7/2011 | Rowe et al. |
| 7,988,550 B2 | 8/2011 | White |
| 8,016,666 B2 | 9/2011 | Angell |
| 8,020,866 B2 | 9/2011 | Walker et al. |
| 8,021,227 B2 | 9/2011 | Baerlocher |
| 8,023,133 B2 | 9/2011 | Kaneko |
| 8,038,527 B2 | 10/2011 | Walker et al. |
| 8,057,302 B2 | 11/2011 | Wells et al. |
| 8,066,564 B2 | 11/2011 | Randall |
| 8,070,578 B2 | 12/2011 | Michaelson et al. |
| 8,070,590 B2 | 12/2011 | Cannon et al. |
| 8,087,999 B2 | 1/2012 | Oberberger et al. |
| 8,096,872 B2 | 1/2012 | Walker et al. |
| 8,109,821 B2 | 2/2012 | Kovacs et al. |
| 8,118,668 B2 | 2/2012 | Gagner et al. |
| 8,128,491 B2 | 3/2012 | Vasquez et al. |
| 8,128,492 B2 | 3/2012 | Vasquez et al. |
| 8,133,102 B2 | 3/2012 | Dabrowski |
| 8,152,624 B2 | 4/2012 | Gerrard et al. |
| 8,152,629 B2 | 4/2012 | DeWaal et al. |
| 8,167,711 B2 | 5/2012 | Baerlocher |
| 8,172,660 B2 | 5/2012 | Lancaster et al. |
| 8,177,627 B2 | 5/2012 | Baerlocher |
| 8,182,323 B2 | 5/2012 | Okada |
| 8,192,276 B2 | 6/2012 | Walker |
| 8,197,335 B2 | 6/2012 | DeWaal et al. |
| 8,202,153 B2 | 6/2012 | Baerlocher |
| 8,206,212 B2 | 6/2012 | Iddings et al. |
| 8,219,129 B2 | 7/2012 | Brown |
| 8,220,019 B2 | 7/2012 | Stearns |
| 8,231,456 B2 | 7/2012 | Zielinski |
| 8,235,801 B2 | 8/2012 | Tan |
| 8,267,765 B2 | 9/2012 | Baerlocher |
| 8,282,465 B2 | 10/2012 | Giobbi |
| 8,282,490 B2 | 10/2012 | Arezina |
| 8,305,550 B2 | 11/2012 | Jung et al. |
| 8,313,373 B2 | 11/2012 | Walker et al. |
| 8,317,589 B2 | 11/2012 | Tessmer et al. |
| 8,342,954 B2 | 1/2013 | Oberberger et al. |
| 8,348,750 B2 | 1/2013 | Jordan et al. |
| 8,360,852 B2 | 1/2013 | Randall |
| 8,360,859 B2 | 1/2013 | Walker et al. |
| 8,393,955 B2 | 3/2013 | Arezina et al. |
| 8,403,740 B2 | 3/2013 | Kovacs et al. |
| 8,419,526 B1 | 4/2013 | Cannon et al. |
| 8,425,305 B2 | 4/2013 | Baerlocher et al. |
| 8,430,735 B2 | 4/2013 | Oberberger |
| 8,430,739 B2 | 4/2013 | Rodgers |
| 8,454,427 B2 | 6/2013 | Baerlocher |
| 8,460,095 B2 | 6/2013 | Tan |
| 8,474,820 B2 | 7/2013 | Walker et al. |
| 8,485,888 B2 | 7/2013 | Baerlocher |
| 8,496,521 B2 | 7/2013 | Randall |
| 8,500,533 B2 | 8/2013 | Lutnick et al. |
| 8,506,380 B2 | 8/2013 | Hughes et al. |
| 8,512,144 B2 | 8/2013 | Johnson et al. |
| 8,517,824 B2 | 8/2013 | Zielinski et al. |
| 8,585,479 B2 | 11/2013 | Ryan et al. |
| 8,602,874 B2 | 12/2013 | Rowe et al. |
| 8,613,650 B2 | 12/2013 | Kovacs et al. |
| 8,678,916 B2 | 3/2014 | Cannon et al. |
| 8,721,449 B2 | 5/2014 | Johnson et al. |
| 8,734,236 B2 | 5/2014 | Arezina et al. |
| 9,135,775 B2 | 9/2015 | Pececnik |
| 9,214,056 B2 | 12/2015 | Kovacs et al. |
| 9,472,059 B1 * | 10/2016 | Barksdale ............ G07F 17/3272 |
| 2001/0013681 A1 | 8/2001 | Bruzzese et al. |
| 2001/0039204 A1 | 11/2001 | Tanskanen |
| 2001/0044337 A1 | 11/2001 | Rowe |
| 2002/0010013 A1 | 1/2002 | Walker et al. |
| 2002/0016202 A1 | 2/2002 | Fertitta et al. |
| 2002/0020603 A1 | 2/2002 | Jones |
| 2002/0025850 A1 | 2/2002 | Hafezi |
| 2002/0039917 A1 | 4/2002 | Armstrong et al. |
| 2002/0045472 A1 | 4/2002 | Adams |
| 2002/0061778 A1 | 5/2002 | Acres |
| 2002/0068635 A1 | 6/2002 | Hill |
| 2002/0072404 A1 | 6/2002 | Gerow |
| 2002/0077173 A1 | 6/2002 | Luciano et al. |
| 2002/0077174 A1 | 6/2002 | Luciano et al. |
| 2002/0077182 A1 | 6/2002 | Swanberg |
| 2002/0077712 A1 | 6/2002 | Safaei et al. |
| 2002/0082070 A1 | 6/2002 | Macke et al. |
| 2002/0082071 A1 | 6/2002 | Riendeau et al. |
| 2002/0082085 A1 | 6/2002 | Osterer |
| 2002/0087641 A1 | 7/2002 | Levosky |
| 2002/0090986 A1 | 7/2002 | Cote et al. |
| 2002/0094869 A1 | 7/2002 | Harkham |
| 2002/0094871 A1 | 7/2002 | Luciano et al. |
| 2002/0098882 A1 | 7/2002 | Lind et al. |
| 2002/0098883 A1 | 7/2002 | Packes, Jr. et al. |

(56) References Cited

U.S. PATENT DOCUMENTS

| | | |
|---|---|---|
| 2002/0107066 A1 | 8/2002 | Seelig et al. |
| 2002/0111206 A1 | 8/2002 | Van Baltz |
| 2002/0111207 A1 | 8/2002 | Lind et al. |
| 2002/0111209 A1 | 8/2002 | Walker |
| 2002/0111214 A1 | 8/2002 | Lind et al. |
| 2002/0113369 A1 | 8/2002 | Weingardt |
| 2002/0132661 A1 | 9/2002 | Lind et al. |
| 2002/0132666 A1 | 9/2002 | Lind et al. |
| 2002/0142841 A1 | 10/2002 | Boushy |
| 2002/0145035 A1 | 10/2002 | Jones |
| 2002/0147047 A1 | 10/2002 | Letovsky et al. |
| 2002/0147049 A1 | 10/2002 | Carter, Sr. |
| 2002/0163570 A1 | 11/2002 | Phillips |
| 2002/0169018 A1 | 11/2002 | Schneier et al. |
| 2002/0169021 A1 | 11/2002 | Urie et al. |
| 2002/0169623 A1 | 11/2002 | Call |
| 2002/0173354 A1 | 11/2002 | Winans et al. |
| 2002/0177479 A1 | 11/2002 | Walker et al. |
| 2002/0177480 A1 | 11/2002 | Rowe |
| 2002/0183046 A1 | 12/2002 | Joyce |
| 2002/0183105 A1 | 12/2002 | Cannon et al. |
| 2002/0196342 A1 | 12/2002 | Walker |
| 2002/0198044 A1 | 12/2002 | Walker et al. |
| 2003/0003988 A1 | 1/2003 | Walker |
| 2003/0003997 A1 * | 1/2003 | Vuong .................. G07F 17/32 463/42 |
| 2003/0004871 A1 | 1/2003 | Rowe |
| 2003/0008707 A1 | 1/2003 | Walker |
| 2003/0013512 A1 | 1/2003 | Rowe |
| 2003/0013513 A1 | 1/2003 | Rowe |
| 2003/0013516 A1 | 1/2003 | Walker et al. |
| 2003/0013527 A1 | 1/2003 | Rowe et al. |
| 2003/0027624 A1 | 2/2003 | Gilmore et al. |
| 2003/0027631 A1 | 2/2003 | Hedrick et al. |
| 2003/0027632 A1 | 2/2003 | Sines |
| 2003/0032474 A1 | 2/2003 | Kaminkow |
| 2003/0032478 A1 | 2/2003 | Takahama et al. |
| 2003/0032479 A1 | 2/2003 | LeMay et al. |
| 2003/0032485 A1 | 2/2003 | Cockerille |
| 2003/0036425 A1 | 2/2003 | Kaminkow et al. |
| 2003/0045354 A1 | 3/2003 | Giobbi |
| 2003/0054868 A1 | 3/2003 | Paulsen et al. |
| 2003/0054880 A1 | 3/2003 | Lam et al. |
| 2003/0054881 A1 | 3/2003 | Hedrick et al. |
| 2003/0060271 A1 | 3/2003 | Gilmore et al. |
| 2003/0064800 A1 | 4/2003 | Jackson et al. |
| 2003/0064805 A1 | 4/2003 | Wells |
| 2003/0069074 A1 | 4/2003 | Jackson |
| 2003/0073497 A1 | 4/2003 | Nelson |
| 2003/0074259 A1 | 4/2003 | Slyman, Jr. |
| 2003/0083126 A1 | 5/2003 | Paulsen |
| 2003/0083943 A1 | 5/2003 | Adams et al. |
| 2003/0087690 A1 | 5/2003 | Loose et al. |
| 2003/0092477 A1 | 5/2003 | Luciano, Jr. |
| 2003/0096645 A1 | 5/2003 | Soltys et al. |
| 2003/0100359 A1 | 5/2003 | Loose et al. |
| 2003/0100371 A1 | 5/2003 | Gatto et al. |
| 2003/0100372 A1 | 5/2003 | Gatto et al. |
| 2003/0104865 A1 | 6/2003 | Itkis |
| 2003/0119579 A1 | 6/2003 | Walker et al. |
| 2003/0125101 A1 | 7/2003 | Campo |
| 2003/0130028 A1 | 7/2003 | Aida et al. |
| 2003/0139214 A1 | 7/2003 | Wolf et al. |
| 2003/0141359 A1 | 7/2003 | Dymovsky |
| 2003/0144052 A1 | 7/2003 | Walker |
| 2003/0148812 A1 | 8/2003 | Paulsen |
| 2003/0149619 A1 | 8/2003 | Stanley et al. |
| 2003/0162588 A1 | 8/2003 | Brosnan et al. |
| 2003/0162591 A1 | 8/2003 | Nguyen |
| 2003/0172037 A1 | 9/2003 | Jung |
| 2003/0176214 A1 | 9/2003 | Burak et al. |
| 2003/0181231 A1 | 9/2003 | Vancura et al. |
| 2003/0186734 A1 | 10/2003 | LeMay et al. |
| 2003/0186739 A1 | 10/2003 | Paulsen |
| 2003/0187736 A1 | 10/2003 | Teague et al. |
| 2003/0193136 A1 | 10/2003 | Walker et al. |
| 2003/0195036 A1 | 10/2003 | Poole et al. |
| 2003/0199321 A1 | 10/2003 | Williams |
| 2003/0203756 A1 | 10/2003 | Jackson |
| 2003/0207711 A1 | 11/2003 | Rowe |
| 2003/0211884 A1 | 11/2003 | Gauselmann |
| 2003/0216166 A1 | 11/2003 | Baerlocher et al. |
| 2003/0216169 A1 | 11/2003 | Walker et al. |
| 2003/0216966 A1 | 11/2003 | Saenz et al. |
| 2003/0224852 A1 | 12/2003 | Walker et al. |
| 2003/0224854 A1 | 12/2003 | Joao |
| 2003/0228900 A1 | 12/2003 | Yamagishi |
| 2003/0232647 A1 | 12/2003 | Moser |
| 2003/0234489 A1 | 12/2003 | Okada |
| 2003/0236114 A1 | 12/2003 | Griswold et al. |
| 2003/0236116 A1 | 12/2003 | Marks et al. |
| 2003/0236118 A1 | 12/2003 | Okada |
| 2004/0002379 A1 | 1/2004 | Parrott et al. |
| 2004/0014514 A1 | 1/2004 | Yacenda |
| 2004/0016797 A1 | 1/2004 | Jones |
| 2004/0023714 A1 | 2/2004 | Asdale |
| 2004/0023721 A1 | 2/2004 | Giobbi |
| 2004/0024608 A1 | 2/2004 | Saenz et al. |
| 2004/0029636 A1 | 2/2004 | Wells |
| 2004/0032086 A1 | 2/2004 | Barragan |
| 2004/0038735 A1 | 2/2004 | Steil |
| 2004/0039635 A1 | 2/2004 | Linde |
| 2004/0039679 A1 | 2/2004 | Norton et al. |
| 2004/0039695 A1 | 2/2004 | Rowe |
| 2004/0043814 A1 | 3/2004 | Angell et al. |
| 2004/0048644 A1 | 3/2004 | Gerrard et al. |
| 2004/0053663 A1 | 3/2004 | Paulsen |
| 2004/0063490 A1 | 4/2004 | Okada |
| 2004/0066475 A1 | 4/2004 | Searle |
| 2004/0070146 A1 | 4/2004 | Snow |
| 2004/0077408 A1 | 4/2004 | D'Amico et al. |
| 2004/0084843 A1 | 5/2004 | Snow |
| 2004/0085293 A1 | 5/2004 | Soper |
| 2004/0090003 A1 | 5/2004 | Snow |
| 2004/0090005 A1 | 5/2004 | Snow |
| 2004/0092303 A1 | 5/2004 | George et al. |
| 2004/0092315 A1 | 5/2004 | Boyd et al. |
| 2004/0106449 A1 | 6/2004 | Walker et al. |
| 2004/0106454 A1 | 6/2004 | Walker |
| 2004/0113360 A1 | 6/2004 | George et al. |
| 2004/0116178 A1 | 6/2004 | Okada |
| 2004/0127277 A1 | 7/2004 | Walker |
| 2004/0127284 A1 | 7/2004 | Walker et al. |
| 2004/0129773 A1 | 7/2004 | Lute, Jr. |
| 2004/0132531 A1 | 7/2004 | George et al. |
| 2004/0132532 A1 | 7/2004 | Brosnan et al. |
| 2004/0142739 A1 | 7/2004 | Loose et al. |
| 2004/0143496 A1 | 7/2004 | Saenz |
| 2004/0145116 A1 | 7/2004 | Calvo et al. |
| 2004/0147303 A1 | 7/2004 | Imura et al. |
| 2004/0147314 A1 | 7/2004 | LeMay |
| 2004/0150162 A1 | 8/2004 | Okada |
| 2004/0152509 A1 | 8/2004 | Hornik et al. |
| 2004/0162146 A1 | 8/2004 | Ooto |
| 2004/0166925 A1 | 8/2004 | Emori et al. |
| 2004/0171423 A1 | 9/2004 | Silva et al. |
| 2004/0183972 A1 | 9/2004 | Bell |
| 2004/0185935 A1 | 9/2004 | Yamagishi |
| 2004/0190042 A1 | 9/2004 | Ferlitsch |
| 2004/0192430 A1 | 9/2004 | Burak et al. |
| 2004/0192434 A1 | 9/2004 | Walker |
| 2004/0198485 A1 | 10/2004 | Loose et al. |
| 2004/0199284 A1 | 10/2004 | Hara |
| 2004/0207154 A1 | 10/2004 | Okada |
| 2004/0209666 A1 | 10/2004 | Tashiro |
| 2004/0209667 A1 | 10/2004 | Emori et al. |
| 2004/0209668 A1 | 10/2004 | Okada |
| 2004/0209671 A1 | 10/2004 | Okada |
| 2004/0209674 A1 | 10/2004 | Conover et al. |
| 2004/0209678 A1 | 10/2004 | Okada |
| 2004/0209683 A1 | 10/2004 | Okada |
| 2004/0209690 A1 | 10/2004 | Bruzzese |
| 2004/0214622 A1 | 10/2004 | Atkinson |
| 2004/0214635 A1 | 10/2004 | Okada |

(56) References Cited

U.S. PATENT DOCUMENTS

| | | |
|---|---|---|
| 2004/0214637 A1 | 10/2004 | Nonaka |
| 2004/0219975 A1 | 11/2004 | Soltys et al. |
| 2004/0224747 A1 | 11/2004 | Okada |
| 2004/0225565 A1 | 11/2004 | Selman |
| 2004/0233663 A1 | 11/2004 | Emslie et al. |
| 2004/0239582 A1 | 12/2004 | Seymour |
| 2004/0254006 A1 | 12/2004 | Lam et al. |
| 2004/0254009 A1 | 12/2004 | D'Amico et al. |
| 2004/0254013 A1 | 12/2004 | Quraishi et al. |
| 2004/0254014 A1 | 12/2004 | Quraishi et al. |
| 2004/0259640 A1 | 12/2004 | Gentles |
| 2004/0266395 A1 | 12/2004 | Pailles |
| 2004/0266516 A1 | 12/2004 | Thomas |
| 2004/0266517 A1 | 12/2004 | Bleich et al. |
| 2005/0003886 A1 | 1/2005 | Englman et al. |
| 2005/0003890 A1 | 1/2005 | Hedrick et al. |
| 2005/0009600 A1 | 1/2005 | Rowe et al. |
| 2005/0013527 A1 | 1/2005 | Doyle et al. |
| 2005/0014554 A1 | 1/2005 | Walker |
| 2005/0014558 A1 | 1/2005 | Estey |
| 2005/0020354 A1 | 1/2005 | Nguyen |
| 2005/0027381 A1 | 2/2005 | George et al. |
| 2005/0032571 A1 | 2/2005 | Asonuma |
| 2005/0032575 A1 | 2/2005 | Goforth et al. |
| 2005/0037837 A1 | 2/2005 | Rowe |
| 2005/0037843 A1 | 2/2005 | Wells et al. |
| 2005/0049032 A1 | 3/2005 | Kobayashi |
| 2005/0049046 A1 | 3/2005 | Kobayashi |
| 2005/0049049 A1 | 3/2005 | Griswold |
| 2005/0054438 A1 | 3/2005 | Rothschild |
| 2005/0054439 A1 | 3/2005 | Rowe et al. |
| 2005/0054446 A1 | 3/2005 | Kammler et al. |
| 2005/0059449 A1 | 3/2005 | Yarbrough |
| 2005/0059457 A1 | 3/2005 | Rothschild et al. |
| 2005/0059466 A1 | 3/2005 | Yarbrough |
| 2005/0059480 A1 | 3/2005 | Soukup et al. |
| 2005/0059485 A1 | 3/2005 | Paulsen et al. |
| 2005/0062410 A1 | 3/2005 | Bell et al. |
| 2005/0063055 A1 | 3/2005 | Engel |
| 2005/0070257 A1 | 3/2005 | Saarinen |
| 2005/0075165 A1 | 4/2005 | George et al. |
| 2005/0075889 A1 | 4/2005 | Gomes et al. |
| 2005/0076242 A1 | 4/2005 | Breuer |
| 2005/0079913 A1 | 4/2005 | Inamura |
| 2005/0085292 A1 | 4/2005 | Inamura |
| 2005/0085300 A1 | 4/2005 | Johnson |
| 2005/0096112 A1 | 5/2005 | Guinn, Jr. et al. |
| 2005/0096129 A1 | 5/2005 | Walker et al. |
| 2005/0101383 A1 | 5/2005 | Wells |
| 2005/0101387 A1 | 5/2005 | Wolf |
| 2005/0119044 A1 | 6/2005 | Lim et al. |
| 2005/0119048 A1 | 6/2005 | Soltys et al. |
| 2005/0119052 A1 | 6/2005 | Russell et al. |
| 2005/0130728 A1 | 6/2005 | Nguyen |
| 2005/0130731 A1 | 6/2005 | Englman et al. |
| 2005/0137011 A1 | 6/2005 | Walker et al. |
| 2005/0143166 A1 | 6/2005 | Walker et al. |
| 2005/0153768 A1 | 7/2005 | Paulsen |
| 2005/0153772 A1 | 7/2005 | Griswold et al. |
| 2005/0153773 A1 | 7/2005 | Nguyen et al. |
| 2005/0153775 A1 | 7/2005 | Griswold et al. |
| 2005/0170883 A1 | 8/2005 | Muskin |
| 2005/0170892 A1 | 8/2005 | Atkinson |
| 2005/0171808 A1 | 8/2005 | Saenz et al. |
| 2005/0176493 A1 | 8/2005 | Nozaki et al. |
| 2005/0176507 A1 | 8/2005 | Ephrati et al. |
| 2005/0182647 A1 | 8/2005 | Saenz et al. |
| 2005/0187012 A1 | 8/2005 | Walker et al. |
| 2005/0192090 A1 | 9/2005 | Muir et al. |
| 2005/0192099 A1 | 9/2005 | Nguyen et al. |
| 2005/0197183 A1* | 9/2005 | Walker .................. G07F 17/32 463/25 |
| 2005/0206582 A1 | 9/2005 | Bell et al. |
| 2005/0208994 A1 | 9/2005 | Berman |
| 2005/0215310 A1 | 9/2005 | Boyd et al. |
| 2005/0215314 A1 | 9/2005 | Schneider et al. |
| 2005/0215316 A1 | 9/2005 | Rowe et al. |
| 2005/0227770 A1 | 10/2005 | Papulov |
| 2005/0233799 A1 | 10/2005 | LeMay et al. |
| 2005/0233803 A1 | 10/2005 | Yang |
| 2005/0239539 A1 | 10/2005 | Inamura |
| 2005/0240484 A1 | 10/2005 | Yan |
| 2005/0255911 A1 | 11/2005 | Nguyen |
| 2005/0266912 A1 | 12/2005 | Sekiguchi |
| 2005/0282625 A1 | 12/2005 | Nicely |
| 2005/0285337 A1 | 12/2005 | Durham et al. |
| 2005/0287852 A1 | 12/2005 | Sugawara |
| 2006/0018450 A1 | 1/2006 | Sandberg-Diment |
| 2006/0019747 A1 | 1/2006 | Loose et al. |
| 2006/0025195 A1 | 2/2006 | Pennington et al. |
| 2006/0025198 A1 | 2/2006 | Gail et al. |
| 2006/0025199 A1 | 2/2006 | Harkins et al. |
| 2006/0025206 A1 | 2/2006 | Walker et al. |
| 2006/0025222 A1 | 2/2006 | Sekine |
| 2006/0030399 A1 | 2/2006 | Baerlocher |
| 2006/0030403 A1 | 2/2006 | Lafky et al. |
| 2006/0035694 A1 | 2/2006 | Fuller |
| 2006/0035696 A1 | 2/2006 | Walker et al. |
| 2006/0035707 A1 | 2/2006 | Nguyen et al. |
| 2006/0040732 A1 | 2/2006 | Baerlocher et al. |
| 2006/0040733 A1 | 2/2006 | Baerlocher et al. |
| 2006/0040734 A1 | 2/2006 | Baerlocher et al. |
| 2006/0040736 A1 | 2/2006 | Baerlocher et al. |
| 2006/0040741 A1 | 2/2006 | Griswold |
| 2006/0046819 A1 | 3/2006 | Nguyen et al. |
| 2006/0046823 A1 | 3/2006 | Kaminkow |
| 2006/0046834 A1 | 3/2006 | Sekine |
| 2006/0046842 A1 | 3/2006 | Mattice |
| 2006/0046855 A1 | 3/2006 | Nguyen |
| 2006/0049624 A1 | 3/2006 | Brosnan |
| 2006/0068906 A1 | 3/2006 | Morrow et al. |
| 2006/0073870 A1 | 4/2006 | Cannon |
| 2006/0073882 A1 | 4/2006 | Rozkin et al. |
| 2006/0079309 A1 | 4/2006 | Walker et al. |
| 2006/0079333 A1 | 4/2006 | Morrow |
| 2006/0084488 A1 | 4/2006 | Kinsley et al. |
| 2006/0089174 A1 | 4/2006 | Twerdahl |
| 2006/0089194 A1 | 4/2006 | Joshi et al. |
| 2006/0092170 A1 | 5/2006 | Bathiche et al. |
| 2006/0100014 A1 | 5/2006 | Griswold et al. |
| 2006/0103951 A1 | 5/2006 | Bell et al. |
| 2006/0125745 A1 | 6/2006 | Evanicky |
| 2006/0135230 A1 | 6/2006 | Godse et al. |
| 2006/0135240 A1 | 6/2006 | Barshack |
| 2006/0135255 A1 | 6/2006 | Roth |
| 2006/0154719 A1 | 7/2006 | Okuniewicz |
| 2006/0154720 A1 | 7/2006 | Okuniewicz |
| 2006/0154721 A1 | 7/2006 | Okuniewicz |
| 2006/0160620 A1 | 7/2006 | Matthews et al. |
| 2006/0160621 A1 | 7/2006 | Rowe |
| 2006/0165060 A1 | 7/2006 | Dua |
| 2006/0166727 A1 | 7/2006 | Burak |
| 2006/0166732 A1 | 7/2006 | Lechner |
| 2006/0166741 A1 | 7/2006 | Boyd |
| 2006/0173781 A1 | 8/2006 | Donner |
| 2006/0178203 A1 | 8/2006 | Hughes et al. |
| 2006/0178208 A1 | 8/2006 | Cole |
| 2006/0183535 A1 | 8/2006 | Marks et al. |
| 2006/0189382 A1 | 8/2006 | Muir |
| 2006/0191177 A1 | 8/2006 | Engel |
| 2006/0211477 A1 | 9/2006 | Walker et al. |
| 2006/0223627 A1 | 10/2006 | Nozaki |
| 2006/0226598 A1 | 10/2006 | Walker |
| 2006/0246981 A1 | 11/2006 | Walker |
| 2006/0247027 A1 | 11/2006 | Walker et al. |
| 2006/0247037 A1 | 11/2006 | Park |
| 2006/0252504 A1 | 11/2006 | Walker et al. |
| 2006/0252505 A1 | 11/2006 | Walker et al. |
| 2006/0258446 A1 | 11/2006 | Nguyen et al. |
| 2006/0266598 A1 | 11/2006 | Baumgartner |
| 2006/0271433 A1 | 11/2006 | Hughes |
| 2006/0279781 A1 | 12/2006 | Kaneko |
| 2006/0281554 A1 | 12/2006 | Gatto |
| 2006/0284574 A1 | 12/2006 | Emslie et al. |

(56) References Cited

U.S. PATENT DOCUMENTS

| | | |
|---|---|---|
| 2006/0287063 A1 | 12/2006 | Walker et al. |
| 2006/0287072 A1 | 12/2006 | Walker |
| 2006/0287098 A1 | 12/2006 | Morrow |
| 2006/0290594 A1 | 12/2006 | Engel et al. |
| 2007/0004510 A1 | 1/2007 | Underdahl et al. |
| 2007/0010315 A1 | 1/2007 | Hein |
| 2007/0015569 A1 | 1/2007 | Norton et al. |
| 2007/0017979 A1 | 1/2007 | Wu |
| 2007/0021198 A1 | 1/2007 | Muir |
| 2007/0054733 A1 | 3/2007 | Baerlocher et al. |
| 2007/0060271 A1 | 3/2007 | Cregan et al. |
| 2007/0060292 A1 | 3/2007 | Peterson |
| 2007/0060297 A1 | 3/2007 | Hein et al. |
| 2007/0060302 A1 | 3/2007 | Fabbri |
| 2007/0060314 A1 | 3/2007 | Baerlocher et al. |
| 2007/0060321 A1 | 3/2007 | Vasquez et al. |
| 2007/0060372 A1 | 3/2007 | Yamagishi |
| 2007/0077979 A1 | 4/2007 | Cohn et al. |
| 2007/0087818 A1 | 4/2007 | Walker |
| 2007/0105617 A1 | 5/2007 | Walker et al. |
| 2007/0105619 A1 | 5/2007 | Kniestead et al. |
| 2007/0117604 A1* | 5/2007 | Hill .......................... G07F 17/32 463/16 |
| 2007/0117608 A1 | 5/2007 | Roper |
| 2007/0117623 A1 | 5/2007 | Nelson |
| 2007/0121936 A1 | 5/2007 | Guillou et al. |
| 2007/0129123 A1 | 6/2007 | Eryou et al. |
| 2007/0129131 A1 | 6/2007 | Kaminkow et al. |
| 2007/0129137 A1 | 6/2007 | Walker et al. |
| 2007/0129150 A1 | 6/2007 | Crowder |
| 2007/0129151 A1 | 6/2007 | Crowder |
| 2007/0155469 A1 | 7/2007 | Johnson |
| 2007/0155472 A1 | 7/2007 | Gail et al. |
| 2007/0159301 A1 | 7/2007 | Hirt |
| 2007/0167208 A1 | 7/2007 | Acres |
| 2007/0174809 A1 | 7/2007 | Brown |
| 2007/0184887 A1 | 8/2007 | Cannon |
| 2007/0190494 A1 | 8/2007 | Rosenberg |
| 2007/0191088 A1 | 8/2007 | Breckner et al. |
| 2007/0202941 A1 | 8/2007 | Miltenberger |
| 2007/0213124 A1 | 9/2007 | Walker et al. |
| 2007/0218971 A1 | 9/2007 | Berube |
| 2007/0218975 A1 | 9/2007 | Iddings et al. |
| 2007/0218982 A1 | 9/2007 | Baerlocher et al. |
| 2007/0218985 A1 | 9/2007 | Okada |
| 2007/0218991 A1 | 9/2007 | Okada |
| 2007/0238505 A1 | 10/2007 | Okada |
| 2007/0238506 A1 | 10/2007 | Ruckle |
| 2007/0259709 A1 | 11/2007 | Kelly et al. |
| 2007/0259711 A1 | 11/2007 | Thomas |
| 2007/0265060 A1 | 11/2007 | Hornik et al. |
| 2007/0298874 A1 | 12/2007 | Baerlocher et al. |
| 2007/0298875 A1 | 12/2007 | Baerlocher et al. |
| 2008/0009344 A1 | 1/2008 | Graham et al. |
| 2008/0020816 A1 | 1/2008 | Griswold et al. |
| 2008/0020830 A1 | 1/2008 | Ikehara et al. |
| 2008/0020831 A1 | 1/2008 | Ikehara et al. |
| 2008/0020839 A1 | 1/2008 | Wells et al. |
| 2008/0020840 A1 | 1/2008 | Wells et al. |
| 2008/0020841 A1 | 1/2008 | Wells et al. |
| 2008/0026816 A1 | 1/2008 | Sammon et al. |
| 2008/0026823 A1 | 1/2008 | Wolf |
| 2008/0026844 A1 | 1/2008 | Wells |
| 2008/0032801 A1 | 2/2008 | Brunet de Courssou |
| 2008/0039190 A1 | 2/2008 | Walker et al. |
| 2008/0064467 A1 | 3/2008 | Reiner |
| 2008/0070671 A1 | 3/2008 | Okada |
| 2008/0076506 A1 | 3/2008 | Nguyen et al. |
| 2008/0076528 A1 | 3/2008 | Nguyen |
| 2008/0076572 A1 | 3/2008 | Nguyen |
| 2008/0085753 A1 | 4/2008 | Okada |
| 2008/0113765 A1 | 5/2008 | DeWaal |
| 2008/0113802 A1 | 5/2008 | Johnson et al. |
| 2008/0123026 A1 | 5/2008 | Kwag |
| 2008/0139306 A1 | 6/2008 | Lutnick |
| 2008/0146344 A1 | 6/2008 | Rowe et al. |
| 2008/0149705 A1 | 6/2008 | Giobbi et al. |
| 2008/0161101 A1* | 7/2008 | Lutnick .................. G07F 17/32 463/25 |
| 2008/0166997 A1 | 7/2008 | Sun |
| 2008/0182644 A1 | 7/2008 | Lutnick |
| 2008/0182650 A1 | 7/2008 | Randall et al. |
| 2008/0200251 A1 | 8/2008 | Alderucci |
| 2008/0207296 A1 | 8/2008 | Lutnick |
| 2008/0213026 A1 | 9/2008 | Grabiec |
| 2008/0214263 A1 | 9/2008 | Walker et al. |
| 2008/0231611 A1 | 9/2008 | Bathiche et al. |
| 2008/0234028 A1 | 9/2008 | Meyer |
| 2008/0248849 A1* | 10/2008 | Lutnick .................. G07F 17/32 463/16 |
| 2008/0248865 A1 | 10/2008 | Tedesco et al. |
| 2008/0261682 A1 | 10/2008 | Phillips |
| 2008/0268934 A1 | 10/2008 | Mattice |
| 2008/0270302 A1 | 10/2008 | Beenau |
| 2008/0293483 A1 | 11/2008 | Pickus |
| 2008/0300051 A1 | 12/2008 | Walker et al. |
| 2008/0305855 A1 | 12/2008 | Czyzewski et al. |
| 2008/0305862 A1 | 12/2008 | Walker |
| 2008/0311971 A1 | 12/2008 | Dean |
| 2008/0318655 A1 | 12/2008 | Davies |
| 2008/0318668 A1 | 12/2008 | Ching et al. |
| 2009/0023490 A1 | 1/2009 | Moshal |
| 2009/0029766 A1 | 1/2009 | Lutnick et al. |
| 2009/0054149 A1 | 2/2009 | Brosnan |
| 2009/0093300 A1* | 4/2009 | Lutnick .................. G07F 17/32 463/26 |
| 2009/0098932 A1* | 4/2009 | Longway ................ G07F 17/32 463/22 |
| 2009/0111573 A1 | 4/2009 | Iddings |
| 2009/0125429 A1 | 5/2009 | Takayama |
| 2009/0197684 A1 | 8/2009 | Arezina |
| 2009/0291736 A1 | 11/2009 | Walker et al. |
| 2010/0111820 A1 | 5/2010 | Natura et al. |
| 2010/0120506 A1 | 5/2010 | Davis et al. |
| 2010/0130280 A1 | 5/2010 | Arezina et al. |
| 2010/0174650 A1 | 7/2010 | Nonaka |
| 2010/0219234 A1 | 9/2010 | Forbes |
| 2010/0227670 A1 | 9/2010 | Arezina |
| 2010/0234086 A1 | 9/2010 | Michaelson |
| 2010/0234099 A1 | 9/2010 | Rasmussen |
| 2011/0098104 A1 | 4/2011 | Meyerhofer |
| 2011/0111824 A1 | 5/2011 | Cuddy et al. |
| 2011/0275432 A1* | 11/2011 | Lutnick ............... G07F 17/3232 463/25 |
| 2012/0004037 A1 | 1/2012 | Hill |
| 2012/0129611 A1 | 5/2012 | Rasmussen |
| 2014/0221099 A1 | 8/2014 | Johnson et al. |
| 2014/0274252 A1 | 9/2014 | Chun |

FOREIGN PATENT DOCUMENTS

| | | |
|---|---|---|
| EP | 0769769 | 4/1997 |
| EP | 0946028 | 9/1999 |
| EP | 1255234 | 11/2002 |
| GB | 1559496 | 1/1980 |
| GB | 2374294 | 10/2002 |
| GB | 2403429 | 7/2006 |
| JP | 8000829 | 1/1996 |
| JP | 2001276438 | 10/2001 |
| JP | 2002197058 | 7/2002 |
| WO | 99/19027 | 4/1999 |
| WO | 99/42889 | 8/1999 |
| WO | 99/44095 | 9/1999 |
| WO | 00/32286 | 6/2000 |
| WO | 00/67424 | 11/2000 |
| WO | 01/09664 | 2/2001 |
| WO | 01/15127 | 3/2001 |
| WO | 01/15128 | 3/2001 |
| WO | 01/15132 | 3/2001 |
| WO | 02/21467 | 3/2002 |
| WO | 02/45808 | 6/2002 |
| WO | 02/055163 | 7/2002 |
| WO | 02/073501 | 9/2002 |

(56) References Cited

FOREIGN PATENT DOCUMENTS

| | | |
|---|---|---|
| WO | 02/097749 | 12/2002 |
| WO | 03/089082 | 10/2003 |
| WO | 03/093986 | 11/2003 |
| WO | 2004/001486 | 12/2003 |
| WO | 2004/102520 | 11/2004 |
| WO | 2006/034192 | 3/2006 |
| WO | 2006/038819 | 4/2006 |
| WO | 2007/032945 | 3/2007 |
| WO | 2007/073534 | 6/2007 |

* cited by examiner

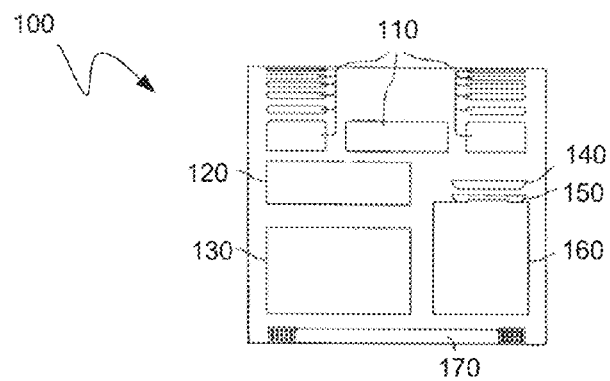
FIG. 1A
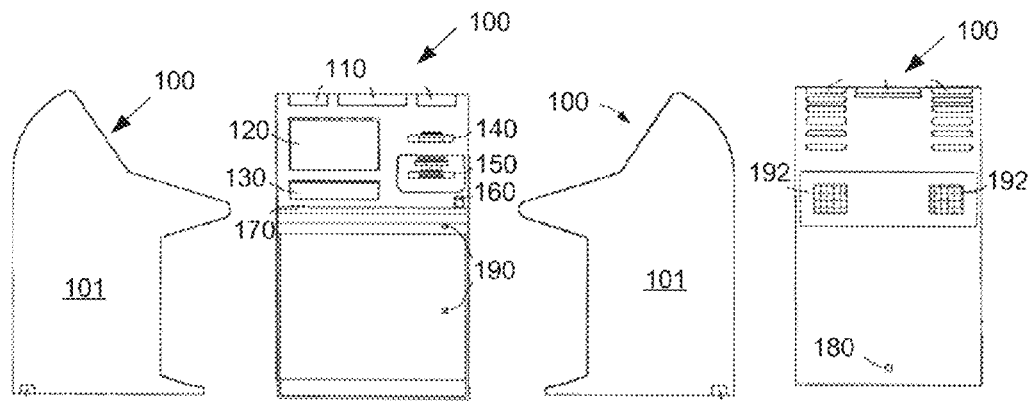
FIG. 1B   FIG. 1C   FIG. 1D   FIG. 1E
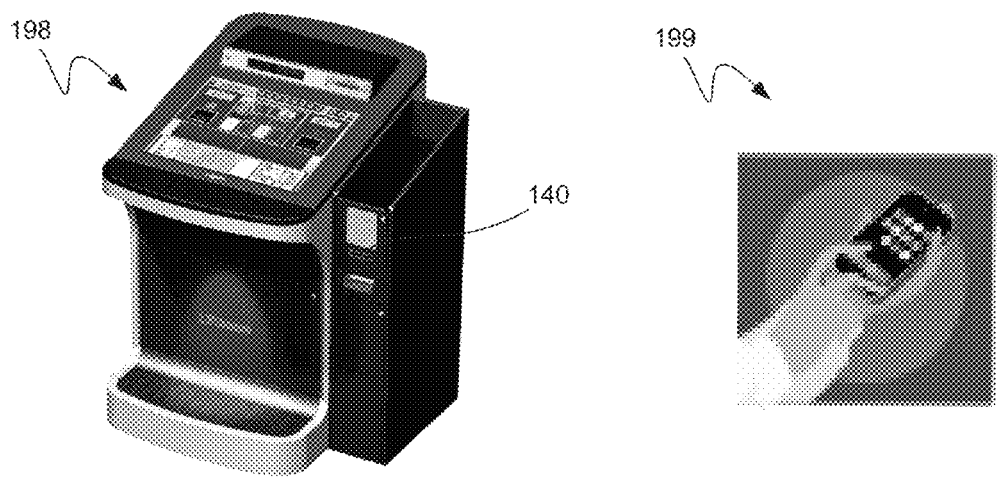
FIG. 1F   FIG. 1G

US 9,916,735 B2

REMOTE GAMING CASH VOUCHER PRINTING SYSTEM

TECHNICAL FIELD

The present invention relates generally to gaming machines, tables and systems, and more particularly to funds transfers between gaming terminals and other gaming system components.

BACKGROUND

Casinos and other resorts that offer wagering games, sports books, and other similar endeavors have grown substantially in popularity and sophistication in recent years. Wagering games such as baccarat, blackjack, roulette, craps, sic-bo, and poker, among many others, are popular table games offered in such establishments. These games are generally administered by human dealers and are played on physical gaming tables having a dealer surface, felt or similar table top layouts, cards, dice, chips and the like, or they can be played on electronic gaming machines where the dealer, playing cards, chips or other gaming elements may be virtual.

While many formats for these table games involve live cash type games against the house or other players, other formats can involve electronic and online versions where players can be at the physical gaming table and/or located remotely from but still playing at the physical gaming table. As a particular example, "stadium style gaming" involves an arrangement where many players may participate at a given live action gaming table by way of remote gaming terminals. In some arrangements, dozens or even hundreds of players may participate at a single table in this manner. Many such arrangements involve the presence of a live dealer, and often there are no players at the actual live gaming table. The use of remote gaming terminals can also allow players to play at multiple live gaming tables simultaneously while being present only at one table or even while not being present at any single table.

Unfortunately, there are several new issues that can arise due to such new arrangements. For example, unlike situations where physical chips or markers are used, it can often be cumbersome or even impossible for a player to tip a dealer that he or she likes or wishes to provide for under a stadium style gaming or other similar arrangement. In addition, it can often be inconvenient or cumbersome to tip waitstaff or give funds locally to a family member or friend when physical chips, markers, or cash are not being used during a gaming experience, even where a player may be doing well and have huge amounts of credit electronically at his or her local electronic gaming terminal. In current arrangements, a player is simply not able to extract only a small tip amount, drink amount, or other portion of the funds that he or she has on an electronic gaming terminal.

While the administration of table games and other casino endeavors have worked well in practice over many years, there is always a desire for improvement. What can be improved then are electronic gaming terminals and gaming table systems that allow for the ready and easy transfer of funds for tips and other monetary value transactions without interrupting game play or otherwise inconveniencing players.

SUMMARY

It is an advantage of the present disclosure to provide improved gaming terminals and gaming table systems, particularly with respect to those that allow for the ready and easy transfer of electronic fund portions from player accounts for monetary value transactions, such as tips. This can be accomplished at least in part through the use of electronic gaming terminals and other system components that are configured to permit transfers of portions of funds from a gaming terminal credit balance during a gaming session. In particular, this can include the use of ticket printers or other system devices that provide physical vouchers having a cash value to other persons as designated by players.

In various embodiments of the present disclosure, a gaming table system can include a plurality of electronic gaming tables configured to provide wager-based table games, a plurality of gaming terminals configured to facilitate the play of the wager-based table games at the electronic gaming tables, and a remote print server in communication with at least some of the gaming tables and gaming terminals. Each of the electronic gaming tables can include a physical surface configured for the administration of wager-based table games facilitated by a live human dealer that include the use of one or more physical game components, a table controller configured to control a plurality of electronic gaming table functions, a printer coupled to the table controller and configured to issue cash vouchers at the electronic gaming table, and a table communication interface configured to facilitate communications between the electronic gaming table and one or more external system components. Each of the plurality of gaming terminals can include a terminal controller configured to facilitate the play of wager-based table games by a player thereat, one or more display components coupled to the terminal controller and configured to provide output to the player regarding the play of the wager-based table games, a user interface configured to receive an input that initiates a remote monetary payout request, and a terminal communication interface configured to facilitate communications between the gaming terminal and one or more external system components. The remote print server can be configured to route the remote monetary payout request from a gaming terminals to a printer at an electronic gaming table and cause the printer to issue a cash voucher thereat.

In various detailed embodiments, the remote monetary payout request represents a partial payout of a credit balance at a respective gaming terminal, the remote monetary payout request comprising a partial monetary value that is less than a full monetary value of the credit balance. The remote print server can also be further configured to facilitate debiting the partial monetary value from the full monetary value at the gaming terminal. In various embodiments, the partial monetary value represents a tip amount, which tip amount can be for a live human dealer at one of the electronic gaming tables, for example. In such embodiments, the printer can issue the cash voucher with the tip amount to the live human dealer at or about the time that the remote monetary payout request is made. In addition, the system can be configured to provide the live human dealer with an indication that a tip is being provided at the time that the remote monetary payout request is made, whereby the live human dealer is provided an opportunity to acknowledge the tip. In such embodiments, every tip amount provided to the live human dealer by way of a remote monetary payout request can be printed to a separate cash voucher. In these and other embodiments, the tip amounts might also for other casino personnel at the respective electronic gaming table.

In various further detailed embodiments, the system can also include or at least involve interactions with a cash voucher server in communication with the remote print server, wherein the remote print server is configured to communicate with the cash voucher server to obtain authorization and voucher data for the remote monetary payout request. The cash voucher server can comprise a conventional ticket in ticket out ("TITO") server, for example. In such embodiments, the remote print server can be configured to emulate an electronic gaming terminal that is eligible to receive cash voucher authorization and data from the TITO server.

In various other embodiments of the present disclosure, a remote print server configured to operate within a gaming table system that provides wager-based table games is provided. The remote print server can include a communication interface and a processor, among other components. The communication interface can be configured to facilitate communications between the remote print server and at least a first electronic gaming table and a first gaming terminal, such as those noted above, where the first gaming terminal can be located remotely from the first electronic gaming table. The processor can be coupled to the communication interface and configured to receive a remote monetary payout request, facilitate debiting a monetary value, and route the request. The remote monetary payout request can be from the first gaming terminal, and can represent a partial payout of a credit balance at the first gaming terminal, with the remote monetary payout request comprising a partial monetary value that is less than a full monetary value of the credit balance. The debiting can involve debiting the partial monetary value from the full monetary value at the first gaming terminal. The routing can involve routing the remote monetary payout request from the first gaming terminal to a printer at the first electronic gaming table, and receipt of the remote monetary payout request results in the printer issuing a cash voucher corresponding to the partial monetary value.

In various detailed embodiments, the remote print server can route the remote monetary payout request to the printer at or about the time that the remote monetary payout request is made. Again, the partial monetary value can represent a tip amount, such as for the live human dealer. In addition, the processor can be further configured to facilitate providing the live human dealer with an indication that a tip is being provided at or about the time that the remote monetary payout request is made, whereby the live human dealer is provided an opportunity to acknowledge the tip. The processor can also be further configured to communicate with a cash voucher server to obtain authorization and voucher data for the remote monetary payout request. Such a cash voucher server can be a TITO server, and the remote print server can be further configured to emulate an electronic gaming terminal that is eligible to receive cash voucher authorization and data from the TITO server.

In still further embodiments, various methods are disclosed for providing partial payouts for an electronic player terminal configured to facilitate the play of wager-based table games administered by a live human dealer at a remotely located electronic gaming table within a gaming system. Pertinent process steps can include receiving a remote monetary payout request from the electronic gaming terminal, facilitating a debit amount, and routing the monetary payout request. As in the above embodiments, the remote monetary payout request can represent a partial payout of a credit balance at the first gaming terminal, where the remote monetary payout request comprising a partial monetary value that is less than a full monetary value of the credit balance. Also, the debiting can involve debiting the partial monetary value from the full monetary value at the electronic gaming terminal. The routing can involve routing the remote monetary payout request from the electronic gaming terminal to a printer at the remotely located electronic gaming table, wherein receipt of the remote monetary payout request results in the printer issuing a cash voucher corresponding to the partial monetary value. Again, the disclosed methods can also include process steps toward facilitating an indication to the live human dealer that a tip is being provided at or about the time that the remote monetary payout request is made, and/or also emulating an electronic gaming terminal that is eligible to receive cash voucher authorization and data from a TITO server.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed inventive apparatuses, systems and methods for transferring a portion of player funds from a gaming terminal. These drawings in no way limit any changes in form and detail that may be made to the disclosure by one skilled in the art without departing from the spirit and scope of the disclosure.

FIGS. 1A-1E illustrate in various views an exemplary gaming terminal adapted for transferring a portion of player funds therefrom according to various embodiments of the present disclosure.

FIG. 1F illustrates in front perspective view an exemplary alternative gaming terminal adapted for transferring a portion of player funds therefrom according to various embodiments of the present disclosure.

FIG. 1G illustrates in front perspective view still another exemplary alternative gaming terminal adapted for transferring a portion of player funds therefrom according to various embodiments of the present disclosure.

DETAILED DESCRIPTION

Figure 2A:
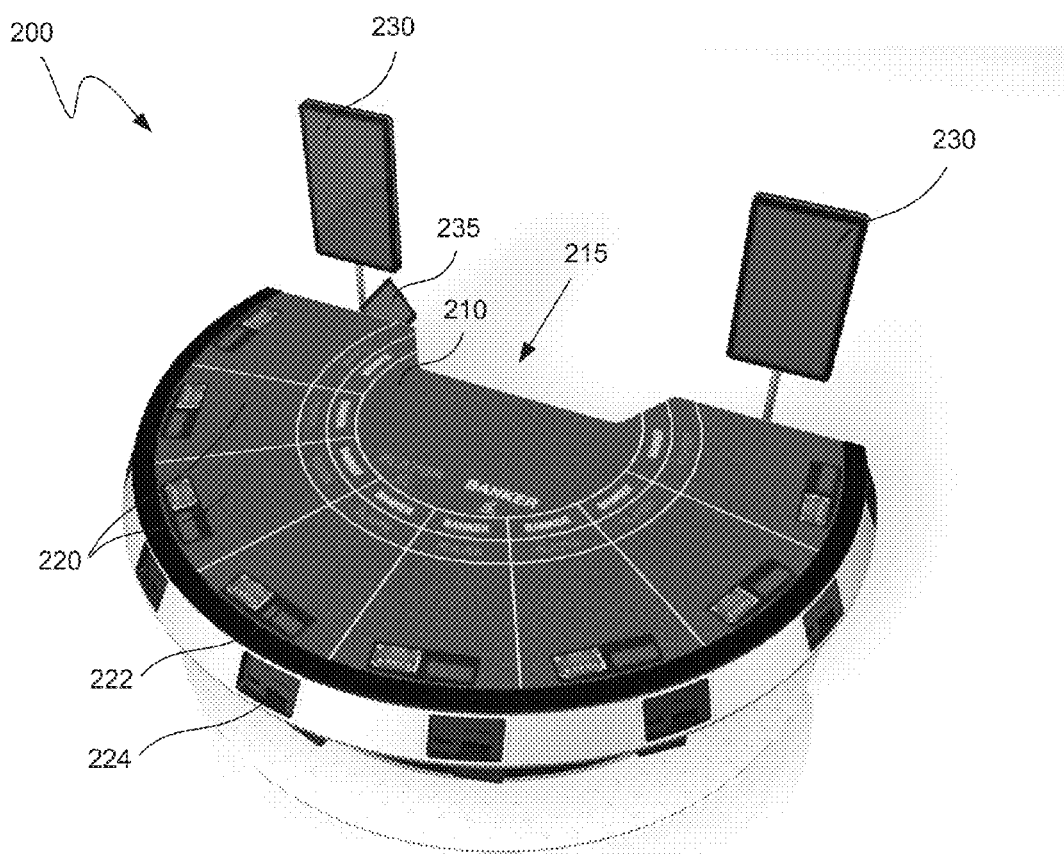
FIGS. 2A and 2B illustrate in top and front perspective views an exemplary electronic gaming table adapted for the play of wager-based table games according to various embodiments of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure generally applies to devices, systems and methods for providing, conducting, and facilitating the play of wager-based games at live electronic gaming tables that can include live dealers, live players, live gaming components, and electronic platforms. As such, this disclosure may be applied to any live table game, such as baccarat, blackjack, roulette, craps, pai gow, sic bo, poker, bingo, keno, card games, and the like, as well as any other type of game having a live or electronic dealer, and/or one or more players seated at a gaming table or electronic gaming platform. In some embodiments, there may be no players seated at the physical gaming table itself, such that all players are playing at gaming terminals that are located apart from or even remotely from the actual physical surface of the gaming table. The various embodiments disclosed herein can be applied with respect to individual player terminals or other associated gaming devices, individual gaming tables, entire systems having both, and methods of running table games and transferring portions of player funds.

This disclosure may also be applied in a live electronic gaming table system that monitors a live table game in which physical or virtual cards are dealt to one or more players at, near, or associated with a gaming table. Alternatively, or in addition, other physical gaming elements can be employed, such as dice, wheels, reels, cards, chips, tokens and the like. The game play data collected can be used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal may be stationary, similar to the slot machines or electronic tables commonly seen at the physical casino, or portable electronic devices such as smart phones, computer tablets, portable media players, laptop computers, desktop computers, smart TV, smart glasses, and the like. Additionally, the respective gaming network can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. Thus, players interested in placing wagers on a live table games are not confined to the gaming table or casino floor.

In general, the present disclosure can pertain to one or more gaming terminals, one or more electronic gaming tables, one or more electronic gaming system servers, and one or more gaming system ticket printers, among other system components. In various embodiments, the player terminal, table and/or system allows remote player terminals to participate as if the remote player has a seat at the physical table. A relevant electronic gaming table system can include live electronic tables ("eTables"), remote game terminals (electronic gaming machine ("EGM"), smart phone, smart TV, tablet, desktop computer, etc.), a central games repository and server that acquires the available live games from each eTable, indexes them and broadcasts the games and games history to other electronic tables, remote game terminals, and remote gaming sites, a multi-site games traffic server that receives remote game requests, verifies a player's eligibility (location, ID, funds, player profile, play history), enforces jurisdictional rules, and routes eligible bets to the player's requested game "channel" being broadcast, a financial server that acts as a Central Clearinghouse for remote wagers, and a network that connects the electronic tables, remote game terminals, the games repository and router, and the financial clearinghouse server.

A table processor and/or remote server can be used to administer the game, track player decisions and decide game outcomes for each player accordingly. Other components and items may also be present as desired. In addition to the various components, details and other aspects set forth herein with respect to the disclosed player terminals, gaming table systems and remote gaming in general, further details and explanations regarding such player terminals, electronic gaming tables and remote table game systems can be found at, for example, U.S. Pat. Nos. 7,914,368; 7,918,723; 7,922,587; 8,182,321; 8,210,920; 8,308,559; and 8,323,105, as well as U.S. patent application Ser. Nos. 13/948,101; 13/893,340; 13/844,617; 13/542,446; 13/456,110; 13/042,633; and 11/198,218, with these references being incorporated herein by reference in their entireties and for all purposes.

Various disclosed embodiments facilitate transferring only a portion of funds from a gaming terminal, rather than a full payout. In particular, embodiments set forth herein provide for a partial payment or payout from a monetary balance or credit at a gaming terminal to another system device at the casino or other gaming establishment or network. Where such partial payouts take the form of a printed cash voucher or other physical item having a cash value, the disclosed embodiments also provide for emulating a cash voucher operation for existing cash voucher systems, such as existing ticket-in ticket-out ("TITO") systems. In some instances, the disclosed embodiments provide solutions for electronic gaming terminals to provide tipping of live dealers and other gaming establishment personnel. This can involve the generation of a separate physical cash voucher for every tip, which physical cash vouchers can be provided at the gaming table or other casino controlled location.

Turning first to FIGS. 1A-1E, an exemplary gaming terminal adapted for transferring a portion of player funds therefrom is shown in various views. FIG. 1A is a top plan view, while FIGS. 1B through 1E are side, front, side and back elevation views respectively. As noted herein, gaming terminal 100 can be referred to in a number of different ways, such as, for example, a gaming terminal, an electronic gaming machine ("EGM"), a player terminal, an electronic player terminal, and the like. Gaming terminal 100 can be linked to various different types of table games, and can be linked to multiple different tables, servers, and/or printers, including simultaneously. A gaming terminal or player terminal can include any suitable EGM, and may include any platform capable of receiving and transmitting data, including "thin-client" platforms or platforms which do not process game play data and "smart" platforms or platforms which process game play data. A player terminal may be stationary, similar to the slot machines or electronic tables commonly seen at the physical casino, and/or may include various types of portable electronic devices such as smart phones, computer tablets, portable media players, laptop computers, desktop computers, smart TV, smart glasses, and the like.

Although a wide variety of possible layouts and arrangements can be applied to any given EGM or gaming terminal 100, a particular configuration is provided herein simply for purposes of illustration. As is generally shown in FIGS. 1A-1E, gaming terminal 100 can include an outer housing 101 that may include a processor or controller (not shown) located therein. Numerous input and output components can be located at various locations about gaming terminal 100. One or more lights or lamps 110 can indicate various status by way of lit, unlit and color arrangements. An upper screen 120 and lower screen 130 can provide various displays to a player, as well as touchscreens that accept player input. Alternatively, or in addition, one or more buttons may also be provided for player inputs. Other components can include a ticket printer 140, bill acceptor 150, shelf 160, and one or more speakers 170. Gaming terminal 100 may also include power input 180, a locking mechanism 190 and one or more fans 192 or other cooling components. Of course, many other input and output components may also be provided at gaming terminal 100, as will be readily appreciated. Further, other configurations, arrangements, shapes and sizes for the player terminal may also be used.

FIG. 1F illustrates in front perspective view an exemplary alternative gaming terminal adapted for transferring a portion of player funds therefrom according to various embodiments of the present disclosure. Alternative gaming terminal 198 can be functionally identical or similar to gaming terminal 100, while differing in overall appearance, such as in size, shape, color, display location, button and input locations, and the like. Various identical or similar items may also be located on alternative gaming terminal 198, such as, for example, a ticket printer 140.

FIG. 1G illustrates in front perspective view still another exemplary alternative gaming terminal adapted for transferring a portion of player funds therefrom according to various embodiments of the present disclosure. Alternative gaming terminal 199 can be a smart phone or other portable user device that is configured to facilitate the play of live table games thereupon. Alternative gaming terminal 199 can also be functionally identical or similar to gaming terminal 100, although some abilities and features obviously may not be present, such as a ticket printer. In various embodiments, alternative gaming terminal 199 can be owned or controlled by an individual player, rather than a casino or other gaming establishment.

Figure 2B:
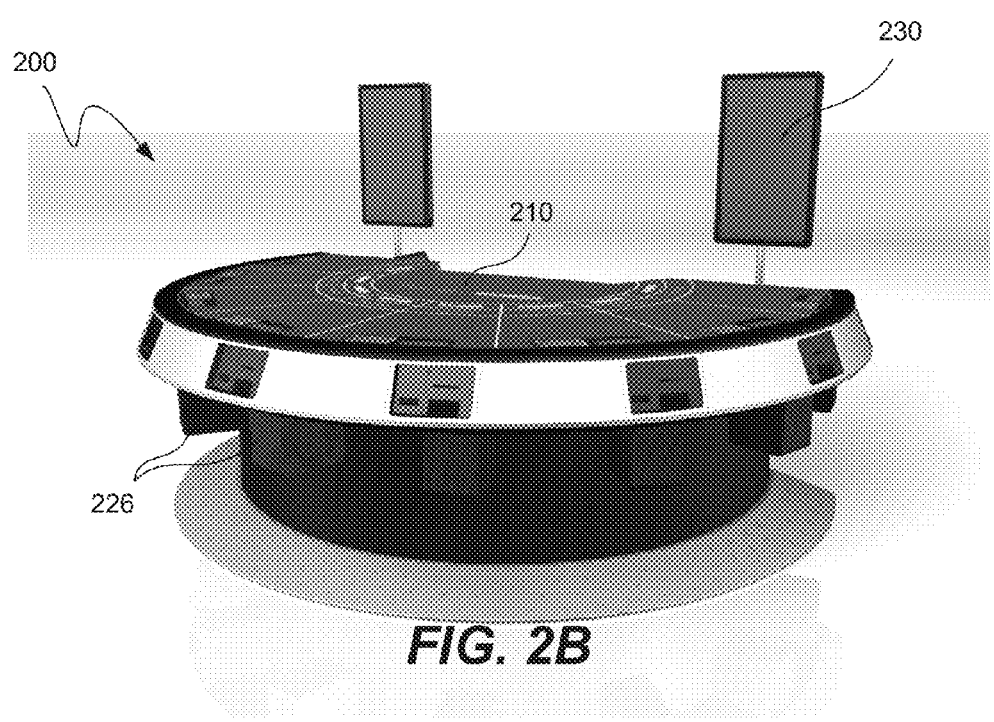

Referring next to FIGS. 2A and 2B, an exemplary electronic gaming table adapted for the play of wager-based table games according to one embodiment of the present disclosure is illustrated in top and front perspective views respectively. It will be readily appreciated that this electronic gaming table ("eTable") 200 can also be provided in numerous other configurations and formats, such that the provided example is for illustrative purposes only. The eTable 200 can include a playing surface 210 adapted for the play of live table games using live physical components, a live dealer station or region 215, a plurality of optional player stations 220, each of which may have its own displays 222, bill acceptor, card acceptor and other input components 224, and one or more community displays 230. One or more physical separators 226 may separate the different player stations 220. In some embodiments, eTable 200 might have no player stations, such that a live dealer merely plays or administers a live game at a table with no players, whereby all player action occurs at remote gaming terminals, such as one or more of electronic player terminal 100 above and/or one or more portable devices, as set forth in greater detail below.

Live dealer station or region 215 may include a dealer display and/or dealer inputs, such as by way of a dealer computing device 235, one or more ticket printers (not shown), one or more dedicated cameras (not shown), and/or various other items that aid a live dealer at the electronic gaming table 200. Dealer station or region 215 may also be referred to as a "dealer terminal" for purposes of an overall system, and can provide for a variety of specific live dealer related functions. For example, dealer terminal 215, such as by way of a dealer display, tablet, and/or other computing device 235, can provide for a dealer log in/out, information broadcasts, and/or manual overrides in case of errors, such as where an eShoe delivers too many cards or an automated hand resolution or payout is wrong. In addition, dealer terminal 215 can facilitate the display of tip information to the dealer, as well as provide the dealer with ways to acknowledge tips, such as by way of dedicated dealer cameras and/or dealer inputs, as set forth in greater detail below.

Each optional player position 220 around the eTable 200 can have a player terminal integrated into it. Like a stand-alone remote gaming terminal 100, each player terminal can have its own controller, buttons, touchscreen display, bill validator, printer, card reader, and so forth. The player terminals can be connected to a table controller ("TC") for the entire table via a switch/hub, and the TC connects to an overall local or wide area network, as provided in greater detail below.

Each eTable 200 can be hosted by a live human dealer, such as at a dealer station 215. The live human dealer can deal real cards and/or use real dice or other physical game components, which can be done on a wooden green-felt table surface 210, for example. Of course, other materials and/or colors may also be used. The cards can be drawn from an electronic shoe ("eShoe"), which is connected to the TC on the local table network. In some embodiments, the eShoe scans the cards and reads the rank and suits for each card removed. The TC, via player login data (such as player tracking card swipe or a cash insertion at the bill acceptor), knows which positions at the table are active and thus can monitor the progress of a game. One or more table sensors, such as a camera, RFID reader, or the like, can be used to capture video of the dealer action for broadcasting, as well as tracking of players and physical game components through a variety of means. The camera can also be used to further verify and keep a log of game activities, such as, for example, cards removed from the eShoe, cards dealt to player positions, bets entered, new players, and the like.

The eTable 200 can also have one or more displays. In one embodiment, there can be one or more community displays 230 to show common player information, such as community cards, table wager minimum, casino name, time, advertisement, and the like. Game history (e.g., baccarat roadmaps) may also be displayed on the same screen 230 or on a separate screen attached to or near the eTable 200. The eTable may also have discrete displays such as On/Off/Flashing lights mounted underneath table graphics to annunciate game information such as Banker Win, Player Win, New Game, No More Bets, and so forth. Such table screens and discrete displays can be driven by the TC.

Figure 3:
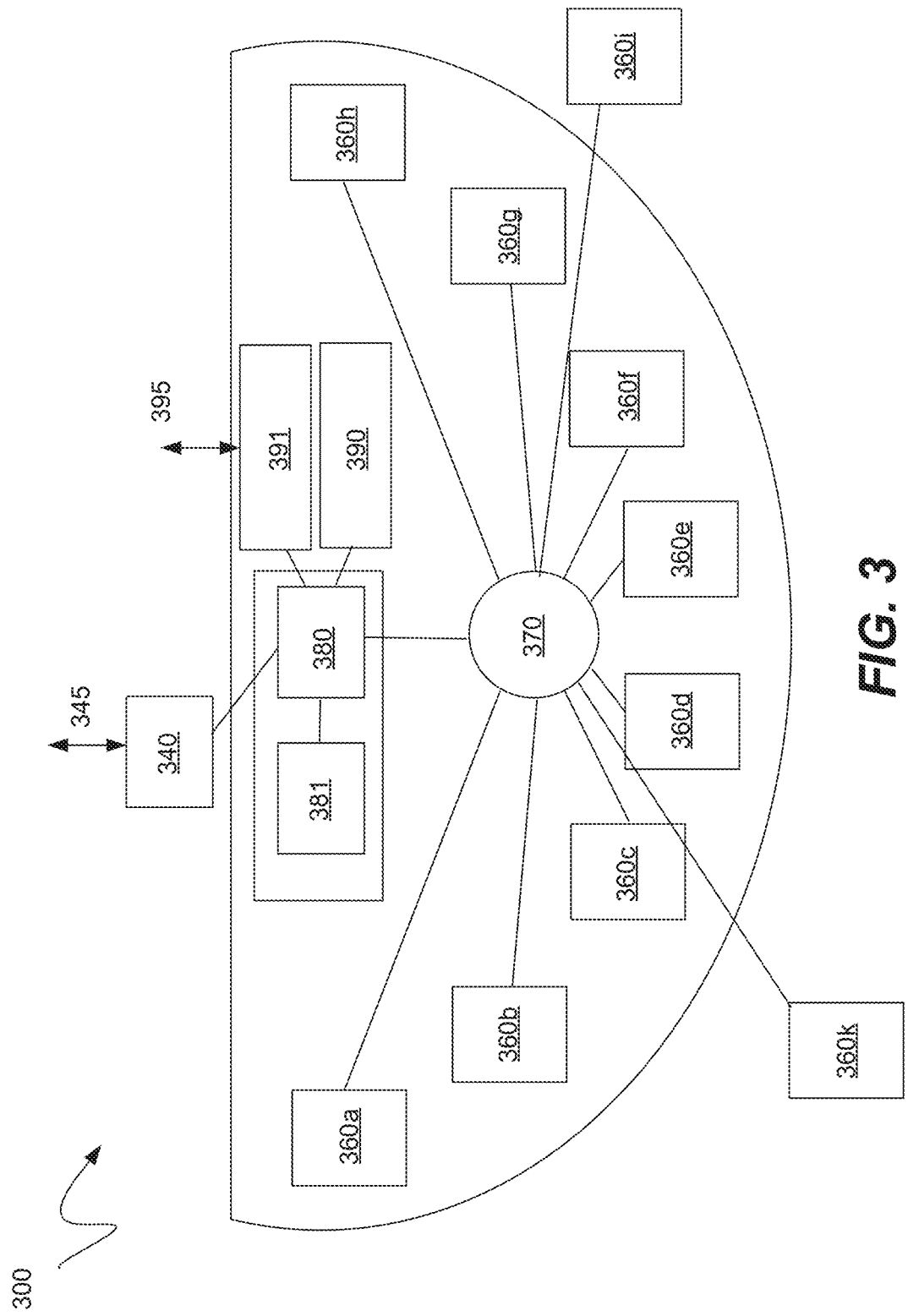
FIG. 3 illustrates in block diagram format an exemplary computing system for an electronic gaming table adapted for the play of wager-based table games according to various embodiments of the present disclosure.

Continuing with FIG. 3, an exemplary computing system for an electronic gaming table adapted for the play of wager-based table games is provided in block diagram format. Computing system 300 for an eTable can include various individual processors and peripherals 360a-360k for a plurality of player terminals or stations. In various embodiments, each of these separate items can be an identical or substantially similar set of processors, displays, inputs and other components, as may be desirable for each separate player station. As shown, some of the player stations (e.g., 360a through 360h) may be physically present at the eTable, while other player stations or terminals (e.g., 360i and 360k) may be located away from the eTable. Such remotely located player stations or terminals can be nearby the table and within view of the playing surface and or an overhead display of the playing surface. In addition, one or more remotely located player stations or terminals be located in a different room or different location entirely, such as where a video feed of the live table game can be provided to the player station for live play. Such remotely located player terminals can take the form of any of gaming terminals 100, 198 above, and/or can be implemented on a third party user device, such as a smart phone, tablet, laptop, PDA, smart glasses, or the like, such as alternative gaming terminal 199.

All of the player station systems 360a-360k can couple to a central router or hub 370, which can be coupled to a master table controller ("TC") having a CPU 380 and memory or storage 381. The TC can be coupled to one or more table displays, as well as an interface 391 for outside communications. Such table display(s) 390 can provide views of the playing surface to many more players that may be nearby the table but not in position to have a good view of the playing surface. In this manner, dozens or hundreds of players can be playing at a single table. Link 395 represents a connection to the network, so that system 300 is able to communicate with various other outside network or system components, such as a remote game server.

In various embodiments, a remote game server can administer some or all of the game away from the actual physical table. The remote server can have the rules of the game, and can be responsible to conduct the table game, such that the TC only conducts data acquisition. As such, the TC can be connected to the card shoe, shuffler, camera(s), dealer terminal, chip counter, overhead display(s), and so forth. In operation, the TC can collect raw data from these peripherals and then provide this data to the host game server located remotely. The remote host or game server can then provide any number of functions, such as, for example, to process the game according to game rules, store the game states, keep track of game history, resolve player hands, credit or debit player accounts, run the community display, and the like. Data from each player terminal can be collected by the table controller or processor (i.e., TC) and forwarded to the remote server, can be sent to the remote server directly from player terminals, or some combination thereof.

In various embodiments, there may or may not be live players at the eTable. That is, in some embodiments the eTable may not have any live players sitting at the table, and rather has only the dealer, playing surface, cards and/or other live physical game components. In such embodiments, all live players may wager on and participate in the game action through remotely located gaming terminals. Again, such remotely located gaming terminals may be nearby the eTable and within view of the playing surface and/or one or more community displays. For example, such nearby player terminals can be within 100 feet of the eTable. Of course, further distances and/or removed locations to other rooms or properties are also possible, such as where the remotely located players can view a video of the live game action.

Computing system 300 for an eTable may also include a separate printer 340, such as at a dealer station, such as dealer station 215 above. Printer 340 may be controlled by CPU 380, by a local processor contained on the printer itself, and/or may be controlled by one or more outside system components, such as over outside connection or link 345. Printer 340 may be adapted to print or otherwise issue physical vouchers having cash value for a live dealer, live waitstaff, and/or one or more other persons, as set forth in greater detail below. In some embodiments, printer 340 may be configured or arranged to issue preprinted tickets or other physical items having discrete cash values, such as in commonly tipped amounts, for example.

Figure 4A:
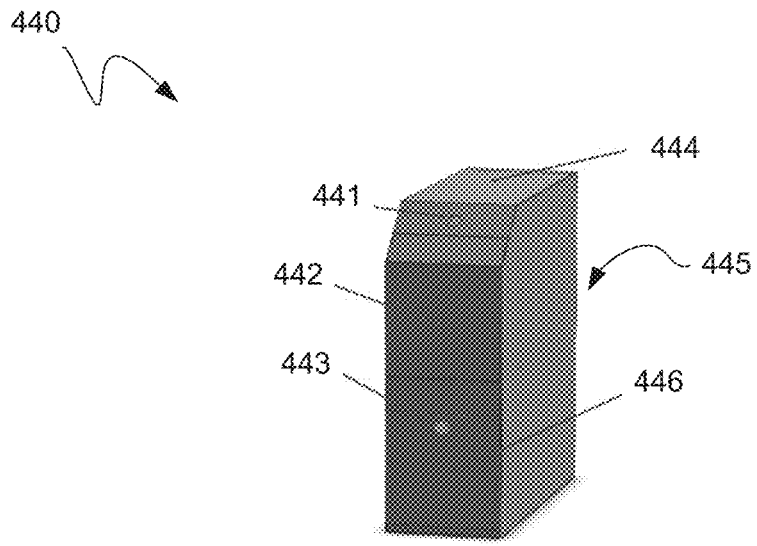
FIG. 4A illustrates in front perspective view an exemplary printer adapted for issuing cash vouchers therefrom according to various embodiments of the present disclosure.

FIG. 4A illustrates in front perspective view an exemplary printer adapted for issuing cash vouchers therefrom according to various embodiments of the present disclosure. Printer 440 can be located at an electronic gaming table (eTable) 200 or other suitable location on the floor of a casino or other gaming establishment, for example. Printer 440 can be freestanding or located on a shelf, and can be about 1 meter×1 meter×0.5 meter, although other sizes may apply. This size for printer 440 can allow for a large amount of paper, ink, materials, and surpluses to be stored or queued inside, such that routine maintenance and upkeep can be streamlined and possibly performed less frequently. Printer 440 can include variety of components, such as a door lock 441, a main door 442, a drop box lock 443, a top access door 444, a power source and communication interface 445, and a drop box door 446, among other externally visible components. These externally visible components can form a custom metal case that is lockable at one or more locations, such as at a top door 444, main door 442, and drop box 446, for example, among other possible locations.

Figure 4B:
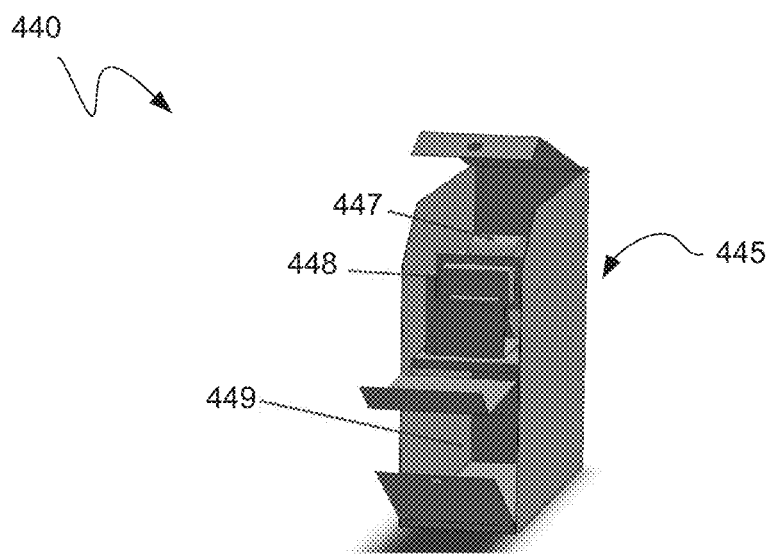
FIG. 4B illustrates in front perspective view the exemplary printer of FIG. 4A with several outer components opened according to various embodiments of the present disclosure.

FIG. 4B illustrates in front perspective view the printer of FIG. 4A with several outer components opened. In particular, the top door, main door, and drop box door are all opened to expose various internal components of printer 440. A paper roll 447 can feed a roll printer 448, both of which reside above a drop box 449. More than one roll printer 448 can be used, if desired. Such roll printers 448 can be used for printing continuous bar codes, for example. Alternatively, printer 440 could house one or more standard gaming printers that print to already discrete ticket sized papers, rather than a roll printer. Such standard gaming printers can be used for redundant print jobs, for example. Printer 440 can also have internal components that include a local processor (not shown), logic board (not shown), and other items that facilitate printer communications and operations. Various sensors (not shown) can also be used to provide alerts as to when paper or ink are low, the drop box is full or removed, or when other notable conditions may arise.

Printer 440 may be configured simply to print or otherwise issue a cash voucher contemporaneously with when a funds transfer or partial payout is routed or processed, such as from a gaming terminal or other remotely located device. Printer 440 may also have one or more additional components that also provide a local alert and/or additional data as to the printing or issuance of a physical cash voucher. For example, printer 440 may include one or more speakers (not shown) and/or one or more simple display screens such as a dealer terminal or other visual outputs (not shown) that indicate when a cash voucher is being printed, as well as one or more details of the cash voucher.

As a particular non-limiting example, printer 440 (or an associated component in close proximity thereto such as a dealer terminal at the table) may display or articulate data regarding the nature of the cash voucher printout, such as what it is, the amount, who it is for, where the game terminal is located, and who it came from, among other possible informational items. In this manner, a dealer or other casino personnel can be apprised of when they are getting a tip in the form of a physical cash voucher, as well as how much the tip is, and who sent it. Such real time or contemporaneous alerts or data provisions can allow the dealer or other personnel to acknowledge the tip, such as by a "thank you," tap, or other gesture.

In various embodiments, printer 440 can be located at or about a respective eTable 200. One or more eTables 200 can each have its own dedicated printer 440, such that physical cash vouchers can be provided to the dealer at the eTable 200 directly and often. In some embodiments, multiple eTables 200 can share a printer 440, such as where a printer might be at the center of a given pit region with multiple tables. A sorting feature or function might be used to separate printed vouchers for different dealers or other personnel.

In various further embodiments, one or more printers 440 may be stationed at other locations away from an eTable 200. For example, a given printer 440 might be located at a bar, within or near a cashier cage, at a sports book, or as a stand-alone kiosk on the gaming floor, for example. In various instances where a printer 440 might be located at a publicly accessible or semi-publicly accessible location, the printer 440 might also have one or more security features that prevent the wrong person from taking a printed ticket or other physical cash voucher issued by the printer 440. For example, a printer 440 might also include a card reader (not shown) or other identifying device, whereby a cash voucher is not printed or otherwise issued for a given person until that person swipes or provides his or her card or identifier to the printer 440.

Figure 5:
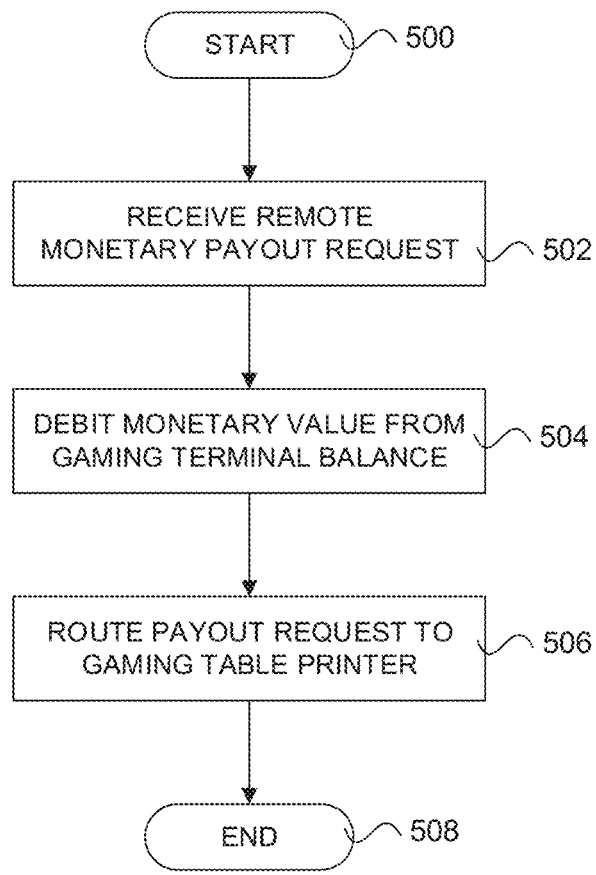
FIG. 5 illustrates a flowchart of an exemplary method of transferring a portion of player funds at a high level according to various embodiments of the present disclosure.

Turning next to FIG. 5, a flowchart is provided of an exemplary method of transferring a portion of player funds at a high level. After a start step 500, a remote monetary payout request can be received at process step 502. In some embodiments, the remote monetary payout request may represent a partial payout of a credit balance at a gaming terminal, such as where the remote monetary payout request involves a partial monetary value that is less than a full monetary value of the credit balance at the gaming terminal. At a subsequent process step 504, the partial monetary value can be debited from the credit balance at the gaming terminal. This can be facilitated by one or more system components, such as a remote print server. For example, a "host-request cashout" command can be issued from the remote printer server 970 Alternatively, the partial cashout request can also be issued directly from gaming device 100 to cause a debiting transaction to the credit account. Prior to the transaction, the player may be asked to confirm the transaction. Then at process step 506, the remote monetary payout request can be routed to a gaming table printer, which may be located at a gaming table that is remote from where the request was made. The method then ends at an end step 508. As will be readily appreciated, this method can allow for transferring a portion of player funds in the form of a gaming terminal credit balance to a remotely located device, without requiring a full payout of the gaming terminal credit balance. The transferred funds may then be printed to or issued in the form of a physical cash voucher, for example.

Figure 6:
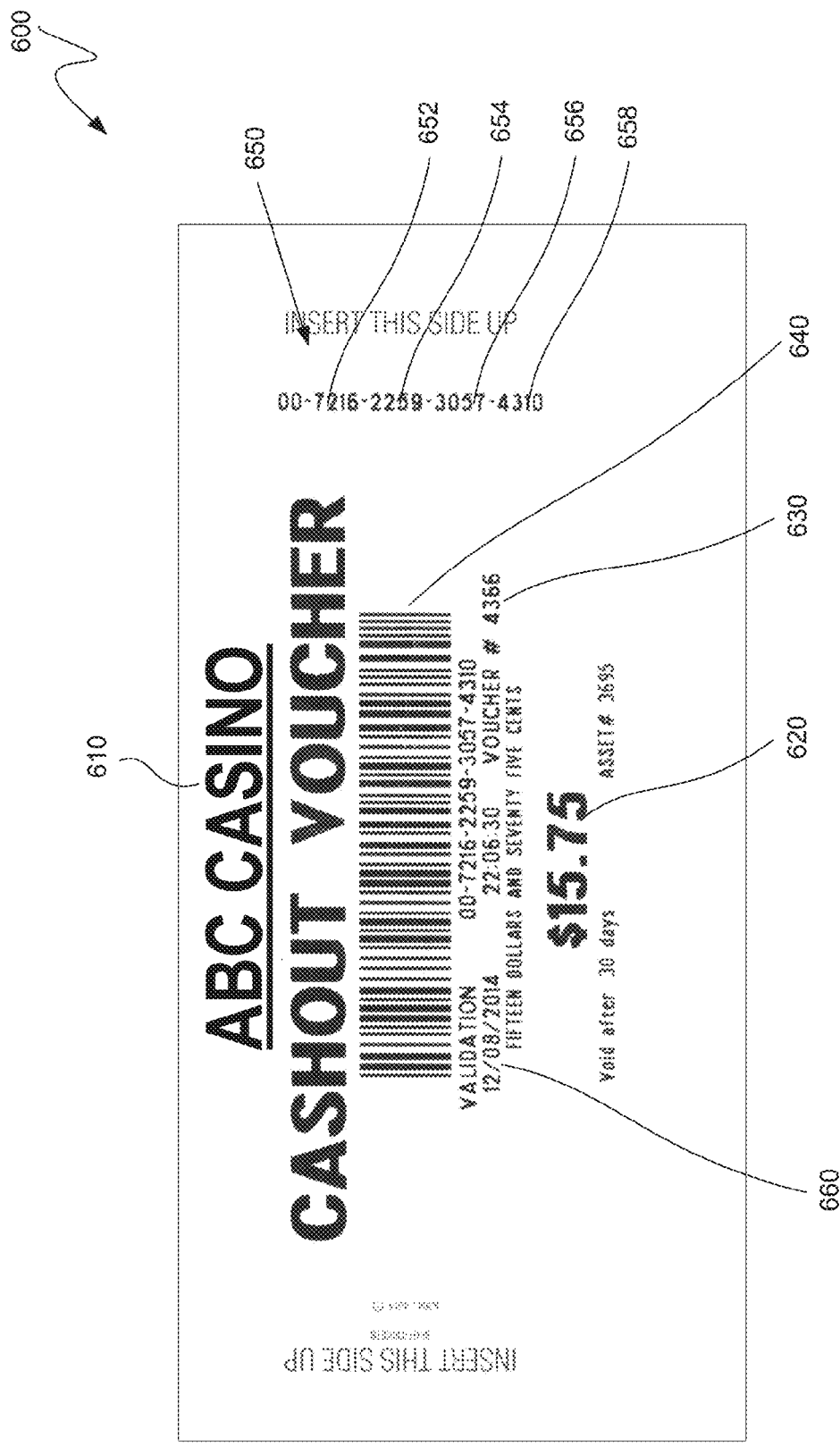
FIG. 6 illustrates in top plan view an exemplary cash voucher according to various embodiments of the present disclosure.

FIG. 6 illustrates in top plan view an exemplary cash voucher according to various embodiments of the present disclosure. Physical cash voucher 600 can be a ticket that is printed or issued from a printing device, such as printer 440 above. Cash voucher 600 can effectively be treated as cash within the gaming system that printed or issued the cash voucher, and as such is typically to be treated with due care. In various embodiments, cash voucher 600 can be redeemable for cash or equivalent monetary credit or consideration to whoever provides the cash voucher 600 for redemption within its issuing system. The cash voucher 600 can be canceled or deactivated upon a single use, or may be reused in certain situations as may be desired within a given issuing system. For example, some cash vouchers 600 having a low common denomination of exactly $1 or $2 might be treated as a reusable cash equivalent within the issuing casino or gaming establishment.

Cash voucher 600 can include a number of identifying indicia and other informational items, such as an issuing entity identifier 610, a monetary amount 620, a unique voucher number 630, and a barcode or other machine readable code 640, among other items. In addition, cash voucher 600 may include one or more specific and non-traditional information items, which may be contained within one or more strings or identifying codes 650. In some arrangements, a given string or identifying code 650 may include multiple sections or portions 652, 654, 656, 658 directed to different things. For example, one code section 652 may identify the gaming terminal that generated the payout request resulting in cash voucher 600, while another code section 654 may identify the destination gaming table, printer, or other component that then issued the cash voucher 600. Another code section 656 might identify the player or sender, while another code section 658 might identify the dealer or other intended recipient of the tip or other item reflected in cash voucher 600. Of course, other data items and/or code sections or types might also be used. Other information printed on cash voucher 600 might also include the date and even the time. In some situations, such additional information printed on cash voucher 600 might aid in the prevention of theft or fraud.

Figure 7:
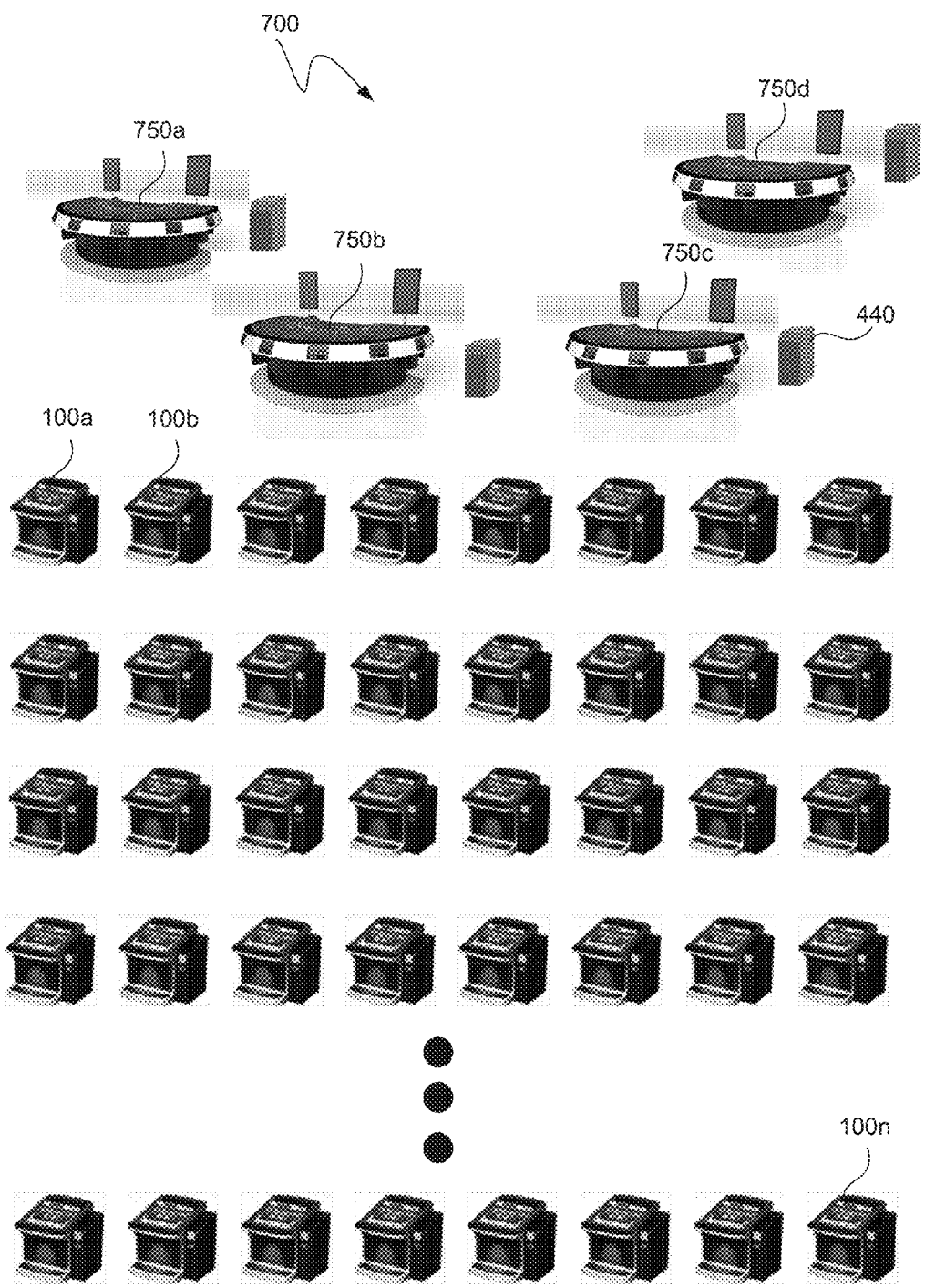
FIG. 7 illustrates in block diagram format an exemplary electronic gaming system featuring multiple gaming terminals and multiple electronic gaming tables in a single location according to various embodiments of the present disclosure.

Moving now to FIG. 7, a block diagram is provided for an exemplary electronic gaming system featuring multiple gaming terminals and multiple electronic gaming tables in a single location according to various embodiments of the present disclosure. Localized gaming system 700 can include a plurality of eTables 750*a*, 750*b*, 750*c*, 750*d*, as well as numerous gaming terminals 100a-100n arranged in the vicinity of and in view of the eTables. As shown, each of the eTables 750a, 750b, 750c, 750d can have its own dedicated printer 440, such as the printer which is provided above. As one example, each of about 100 gaming terminals 100a-100n can be in communication with each of the eTables 750a-750d. Although 4 electronic gaming tables and about 100 gaming terminals are shown, it will be understood that more or fewer of each component may be provided in a given localized gaming system set forth on a single casino floor or other location.

In various embodiments, a player at a given gaming terminal 100x may be provided the ability, such as by way of a button or other input, to switch between any combination of different gaming tables 750a-750d. Further, the player may also be able to provide a tip or other funds transfer from his or her gaming terminal 100x to the dealer at any of the various gaming tables 750a-750d. Again, this may be facilitated by the dedicated printer 440 located at the gaming table chosen, which dedicated printer can issue a physical cash voucher in the amount of the tip.

Figure 8:
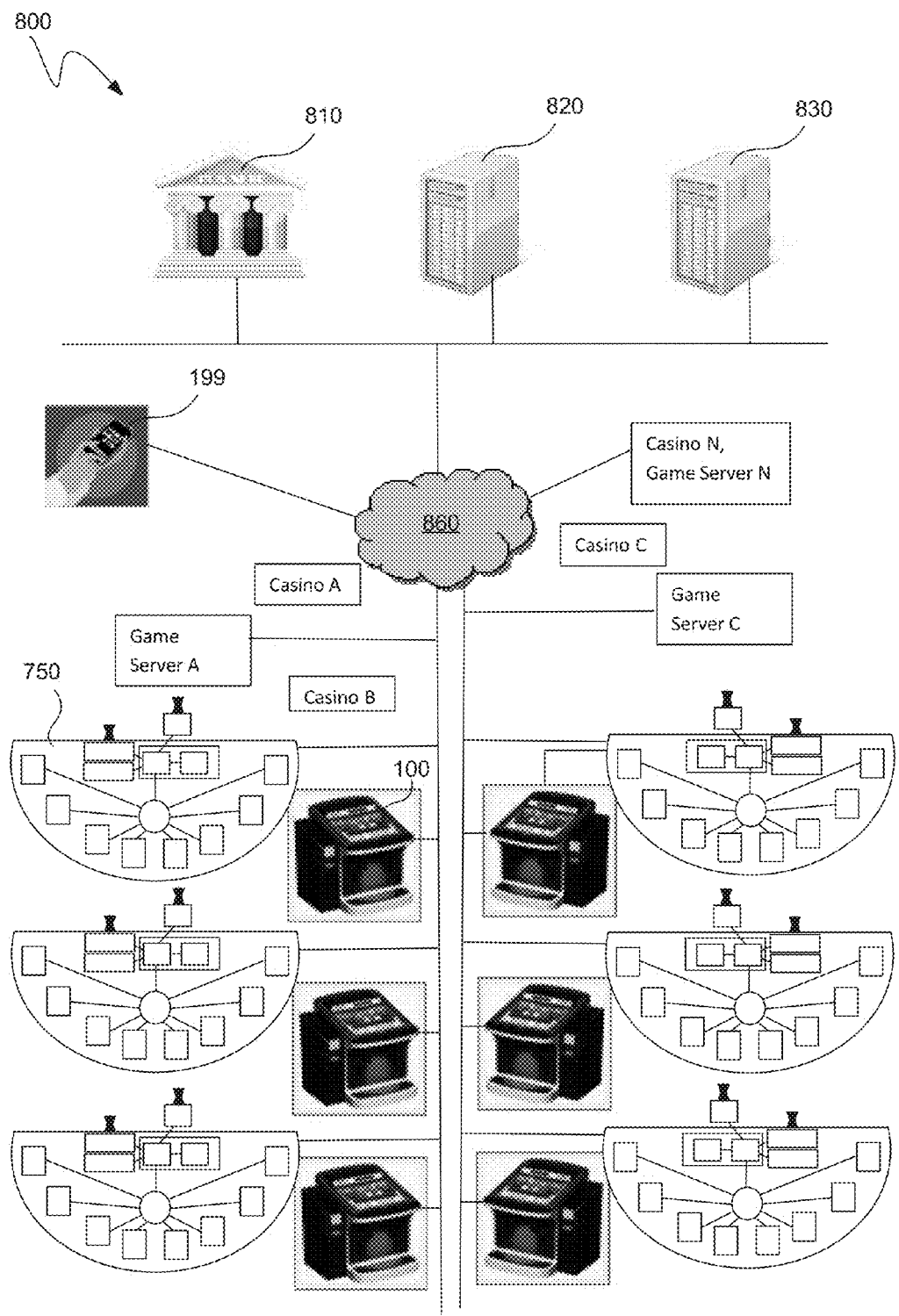
FIG. 8 illustrates in block diagram format an exemplary wide area electronic gaming system utilizing multiple gaming terminals, multiple electronic tables and various other system components across multiple locations according to various embodiments of the present disclosure

FIG. 8 illustrates in block diagram format an exemplary wide area electronic gaming system utilizing multiple gaming terminals, multiple electronic tables and various other system components across multiple locations according to various embodiments of the present disclosure. Wide area system 800 can include a variety of components and items, such as a bank 810, a games router 820, and a financial clearinghouse 830. A cloud 860 or network can couple these items to various eTables, gaming terminals, game servers, casinos, printers, and other distributed components. One or more personal devices 199 can serve as remote player terminals in some embodiments, as noted above. Various networked casinos, game servers, eTables 750 and other remote terminals 100 can also be coupled through the cloud 860 or network in wide area system 800. As will be readily appreciated, some or all of the remote terminals in wide area system 800 can take the form of player terminal 100 set forth above, as well as any suitable variation thereof.

One or more game servers may be present in wide area system 400, and each operates in a particular manner to facilitate the play of the various table games set forth above. In such embodiments, a game server can collect live game information from each eTable, apply game rules, and return game results. Beside monitoring and controlling the games, the game server also keeps track, in a database, of game history of each eTable, accounting information, revenue reports, maintenance information, and the like. Each of these individual functions can be performed by a separate application on a separate server, or integrated into one application running on one comprehensive server. The determination of one or multiple servers and applications depends on the number of eTables, game stations, and/or remote gaming terminals, both local and remote, that are being connected across the system.

Each separate casino or gaming establishment can have a singular or multiple game servers, and each game server can be configured to serve a particular game type (e.g., baccarat, blackjack, roulette, craps, and the like), a quantity of tables, gaming terminals or game stations, or an area of the casino. In a multi-game, multi-site environment, one important function of the game server is the handling of financial transactions from remote game terminals. In some situations, remote game terminals can be logged into a particular eTable. From there, the remote player either participates directly as if he is sitting at the table, or back bets on one of the players at the table. In wide area system 800, however, a remote player need not be constrained to any particular physical eTable. For instance, a player sitting at a seat on a local eTable can wager on the game on going at the local table and at another table at the same casino, or at an eTable at a casino located elsewhere. These capabilities are enabled by a network of game servers, one or more games routers 820, and a central financial clearinghouse 830 for remote wagers. Further details regarding a wide area electronic gaming system utilizing multiple system components across multiple locations can be found at for example, U.S. Pat. Nos. 7,914,368; 7,918,723; 7,922,587; 8,182,321; 8,210,920; 8,308,559; and 8,323,105, as well as U.S. patent application Ser. Nos. 13/948,101; 13/893,340; 13/844,617; 13/542,446; 13/456,110; 13/042,633; and 11/198,218, with these references again being incorporated herein by reference in their entireties and for all purposes.

Wide area system 800 may also be configured for the generation, processing, distribution, tracking, and redemption of physical cash vouchers, such as those issued subject to remote monetary payout requests under the presently disclosed embodiments. Various components of system 800 may also be used to help facilitate the operations of such physical cash vouchers and/or the partial monetary payouts or transfers that they represent. For example, one or more existing servers and/or local databases at various locations can be used to track data with respect to such a partial monetary payout, transfer, and cash voucher system. In general though, there are some components or items that may be specific to implementing the various devices, systems, and methods disclosed herein. In various embodiments, this components or items can be integrated into already existing systems, as noted below.

Figure 9:
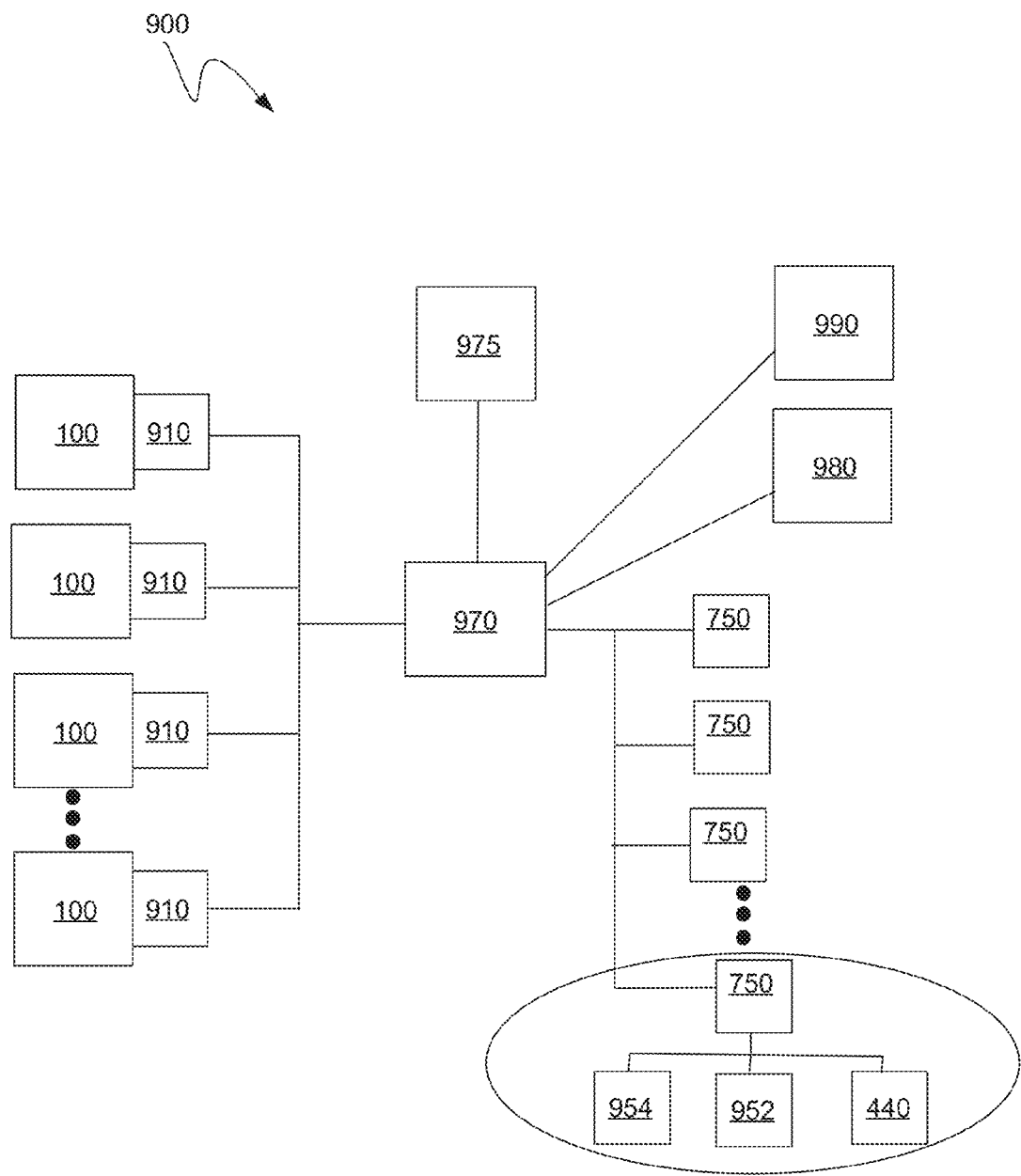
FIG. 9 illustrates in block diagram format an exemplary electronic gaming system having a remote print server adapted for transferring a portion of player funds according to various embodiments of the present disclosure.

Continuing with FIG. 9, an exemplary electronic gaming system having a remote print server adapted for transferring a portion of player funds is illustrated in block diagram format. Electronic gaming system 900 adapted for transferring portions of player funds can include a plurality of gaming terminals 100, which can represent gaming terminals already in existence that have each been retrofitted by way of a specific network interface module ("NIM") 910 that is specially adapted to implement the system 900. It will be understood that there is no limit to the number of such gaming terminals 100 in a given system 900. Also, one or more of gaming terminals 100 can instead be replaced and/or the system 900 augmented by specially adapted gaming terminal(s) (not shown) that is/are configured to operate within electronic gaming system 900 and its various components.

Each NIM 910 can include specialized software, hardware, or both, and each NIM 910 provide for interaction between its respective electronic gaming terminal ("EGT") and a specialized remote print server 970 configured for use within electronic gaming system 900. Remote print server 970 can have its own associated database 975 or other storage component for keeping records on the various remote monetary payout requests that it processes. Remote print server 970 can also be in communication with a conventional ticket processing server 980, such as a TITO server, as well as one or more conventional gaming system servers and components, such as a player tracking server 990, for example. One or more of the EGTs 100 may also be in direct communication with player tracking server 990 and other gaming system components, as will be readily appreciated.

In addition, remote print server 970 can also be in communication with multiple eTables 750, such as those set forth above. One or more of the eTables 750 in communication with the remote print server 970 can include its own printer 440, as well as its own dealer monitor or tablet 952, and/or its own smart signage 954. In some embodiments, multiple eTables may share a printer 440 and/or other items. Dealer monitor or tablet 952, as well as other possible dealer specific items, can be located at a dealer station, such as dealer station 215 set forth above. As such, dealer monitor or tablet 952 can correspond to dealer computing device 235 disclosed above, which may include a dealer display, dealer input items, and/or other components.

The software to support partial cashout transactions and remote printing of the ticket voucher can be built into the EGT 100 or into the NIM controller 910. In various embodiments, a software-updated gaming terminal or NIM-modified existing gaming terminal 100 can be configured to generate special cash out messages that can allow a partial payout of a credit balance at the EGT 100. Such a partial payout can be deducted or debited from the local EGT credit balance, and all appropriate meters can be incremented locally at EGT 100 and on the backend system. Instead of a typical TITO ticket being printed locally at the EGT 100 for such a partial payout, however, the EGT 100 (or respective NIM 910) can be configured to forward the printout to another device. For example, a given EGT 100 might be configured by way of a suitable NIM 910 to remotely "print" a partial payout ticket through a network connection to a remote print server, such as remote print server 970. Other ways to route a partial monetary payout credit from an EGT 100 to another network device by way of a NIM 910 may also be used. For example, if TITO server 980 supports the remote printing function, the partial payout ticket may be routed directly from TITO server 980 to the printer 440 at the destination table.

In various embodiments, the remote print server 970 can be configured to operate within the constructs of an existing TITO system, such as by interacting with an existing TITO server 980. This can involve the remote print server 970 being configured to emulate regular EGTs generating regular cashout requests to the TITO server 980, which emulation can be done in a manner that satisfies the verification and authentication requirements of a TITO system. For example, where a given EGT 100 and NIM 910 pair forwards a remote partial payout request to the remote print server 970, the remote print server can 970 take the amount of the partial payout request and generate an emulated full payout request from a recognized gaming device for sending to the TITO server 980.

When the TITO server 980 acts upon the emulated full payout request by sending authorization and specific ticket data to the remote print server 970, the remote print server 970 does not print out a corresponding specific ticket itself, but rather forwards that data to another remote ticket printer that can then do so. The specific printer to which the data is routed can be one that was specified or indicated by the original partial payout request. In this manner, existing TITO systems having sophisticated and established encoding, recording, and accounting features and processes can be used with system 900.

In this manner, electronic funds transfers can be made to transfer monetary value or credit from EGTs to other gaming system devices. Again, this can include provisions for tipping a live human dealer at an eTable, such as by way of a cash voucher printer at the table. In addition to printing or otherwise issuing a cash voucher at a table printer 440, a communication can also be sent to alert an associated dealer terminal display that the tip or other partial payout is occurring. This can allow the dealer to acknowledge the tip contemporaneously with the tip being made, such as by word or gesture. Such a word or gesture expression may be seen by the player or other tipper at some distance away from the gaming table, or by way of a video feed at a remotely located gaming terminal, or by way of a written message displayed at the gaming terminal, for example.

The provided dealer alert or indication that a tip is being or has been made can be provided in a number of ways. For example, the simple printing or issuance of a discrete, individual cash voucher at a printer next to the dealer can provide such an alert or indication. In addition, an audio alert or message can be provided by the printer 440, and/or at a dealer monitor 952 (e.g., dealer tablet or other computing device 235) or table smart signage 954. Similarly, a visual alert or message regarding the tip or other partial payout can be provided on a display of the printer 440, and/or at the dealer monitor 952 or table smart signage 954. Such alerts or indications can provide various details of the tip or other payout, as may be desired. Such other details can include the amount, who made the tip, and who the tip is for, among other informational items. These informational items can be displayed at a dealer terminal display, for example, and the dealer can acknowledge the receipt of the voucher.

Other types of electronic funds transfers in the form of partial payouts from an EGT credit balance may also be made using the disclosed systems. For example, a monetary transfer may be made between two different EGTs, such as between spouses, friends, or family members. A partial cash out of funds might also be desirable where a player wishes to pocket some of the credit on a credit balance and yet still play on with the rest at the EGT. Payment for drinks, meals, show tickets and other services might be desired as well from a partial payout from an overall EGT credit balance. Still further, tipping to other casino or other host personnel might also be desired, such as to waitresses or pit bosses, for example. Such other tips and other partial payouts may also be by way of remote partial payouts to physical cash vouchers, such as by way of a remote print server and remote printer.

Figure 10:
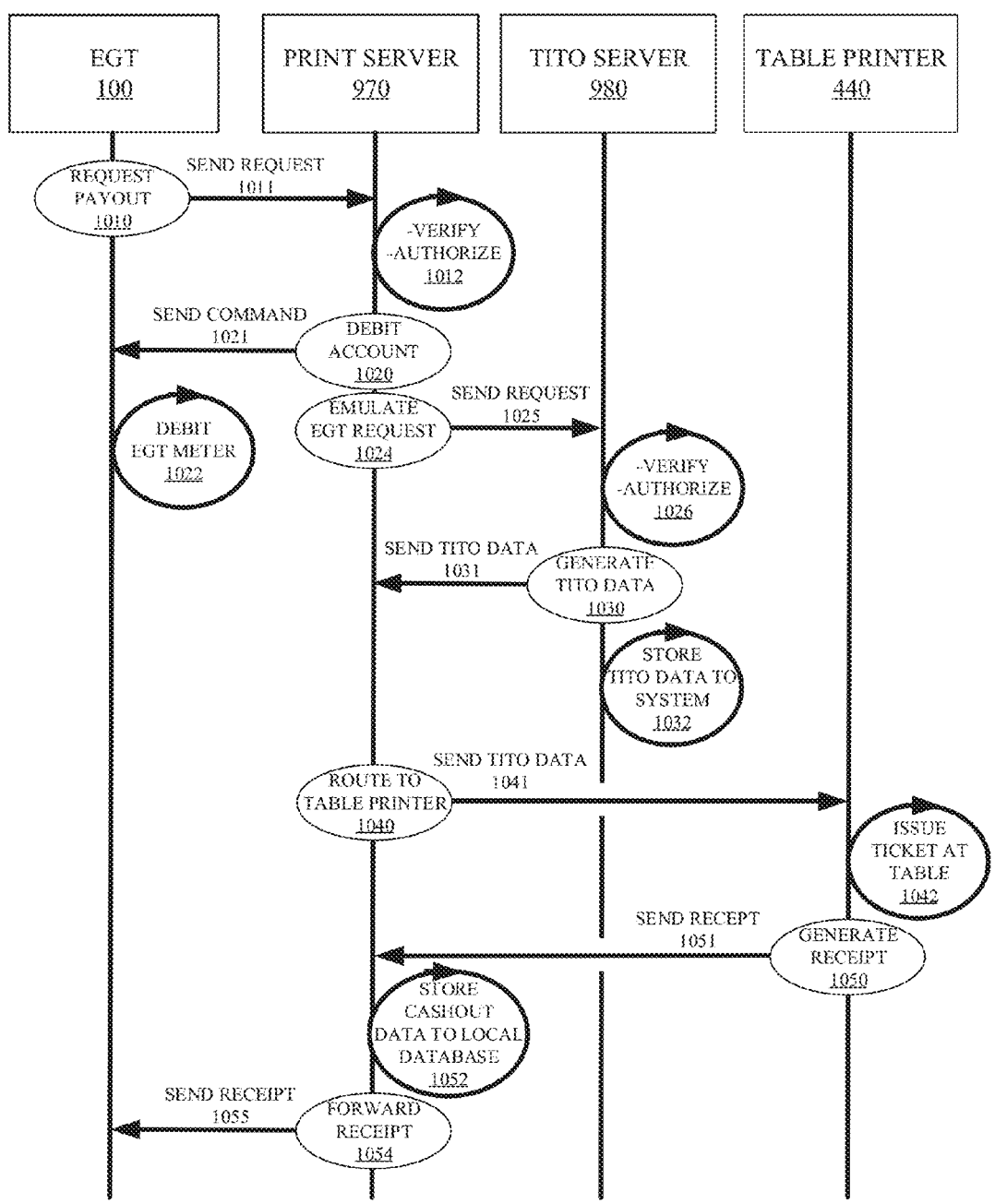
FIG. 10 illustrates a sequence diagram for an exemplary provision of a remote partial payout from a gaming terminal according to various embodiments of the present disclosure.

FIG. 10 illustrates a sequence diagram for an exemplary provision of a remote partial payout from a gaming terminal according to various embodiments of the present disclosure. Sequence diagram 1000 can involve various events, items, and stages that take place between multiple system components. The system components can include a gaming terminal 100 (e.g., EGT), a remote print server 970, a TITO server 980, and a printer 440, which printer can be located at an eTable, for example. Other system items may also be included, but are not shown here for purposes of simplicity in illustration and discussion.

At a first sequence event 1010, a remote partial payout request can be generated at EGT 100. This can represent a player at EGT 100 electing to tip a specific dealer at a selected associated eTable having a particular table printer 440, for example. This remote partial payout request can be sent via communication 1011 from EGT 100 to remote print server 970. Upon receiving the communication 1011, sequence event 1012 at the remote print server 970 can involve verifying that the remote partial payout request is legitimate with adequate funds being available at the requesting EGT 100, as well as authorizing the remote partial payout request.

At a subsequent sequence event 1020, a debit account command can be generated at the remote print server 970, which command can be sent to the EGT 100 by way of communication 1021. After receiving the debit account command via communication 1021, the EGT 100 then debits its own meter accordingly at sequence event 1022. At a subsequent or simultaneous time to sequence event 1020, sequence event 1024 at the remote print server 970 can involve emulating an EGT payout request, which emulated payout request can be sent to a TITO server 980 by way of communication 1025. Upon receiving the communication 1025, sequence event 1026 at the TITO server 980 can involve verifying that the emulated payout request is legitimate with adequate funds being available, as well as authorizing the emulated payout request.

At a subsequent sequence event 1030, the TITO server 980 generates authorization and ticket data, and sends this specific data to the remote print server 970 via communication 1031. At subsequent or simultaneous sequence event 1032, the TITO server 980 also stores this specific data to the TITO system. The remote print server 970 receives the specific ticket data from the TITO server 980 and then routes this data to the requested table printer 440 at sequence event 1040. This data is sent to the table printer 440 by way of communication 1041. The specific table printer 440 routed to can reflect that which was requested as part of the original remote partial payout request at EGT 100. The table printer 440 can then issue a physical cash voucher for the right amount at sequence event 1042. This can involve printing a ticket at the table printer 440 upon receiving the specific ticket data.

At a following sequence event 1050, an electronic receipt or confirmation of the payout can be generated at the table printer 440, which receipt can be sent to the remote print server 970 via communication 1051. The remote print server can store data regarding the payout at its own associated local database at sequence event 1052. At subsequent or simultaneous sequence event 1054, the electronic receipt or confirmation can be forwarded to the EGT 100, which can take place by way of communication 1055. The player or other sender at the EGT can then note that the remote partial payout request has been granted, and that payout was made as intended, such as in the case of an individual specific tip to a dealer.

Figure 11:
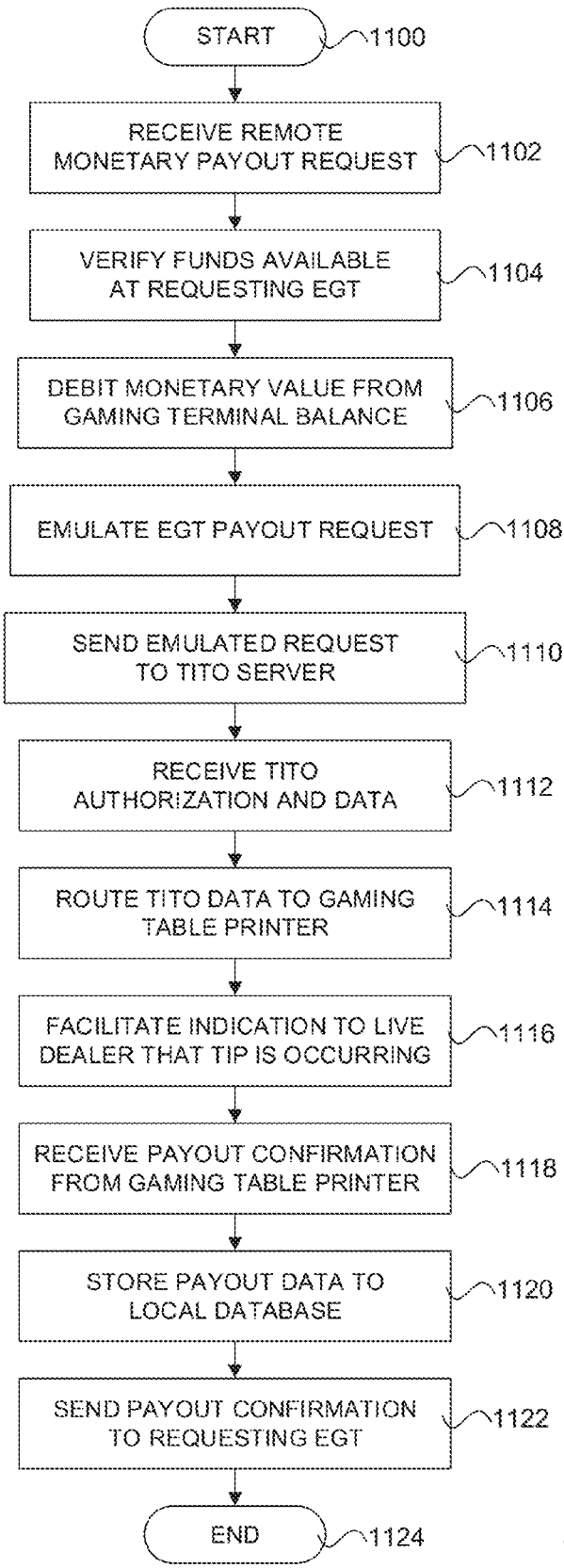
FIG. 11 illustrates a flowchart of an exemplary method performed by a remote print server for facilitating a remote partial payout from a gaming terminal according to various embodiments of the present disclosure.

FIG. 11 illustrates a flowchart of an exemplary method performed by a remote print server for facilitating a remote partial payout from a gaming terminal according to various embodiments of the present disclosure. In various embodiments, the method can be performed by a processor at the remote print server, for example, which processor can include one or more specialized modules configured to execute at the remote print server to facilitate the method. In some embodiments, one or more of the method steps might be performed at one or more alternative associated system devices or components. After a start step 1100, an initial process step 1102 can involve receiving a remote monetary payout request. Again, this can be generated by a player at an EGT, and may represent a tip amount or other small monetary transfer amount, such as for a live dealer, for example.

At a subsequent process step 1104, a verification can be made that funds are available at the EGT where the remote monetary payout request was made. If such funds are available, then a monetary value can be debited from a gaming terminal balance at the requesting EGT at process step 1106. This debiting can be facilitate by the remote print server, such as by sending a suitable command back to the requesting EGT. An EGT payout request can then be emulated at process step 1108, after which the emulated request is sent to a TITO server or other suitable ticket voucher server at process step 1110.

At a subsequent process step 1112, an authorization and specific ticket data (e.g., TITO authorization and data) can be received from the TITO server or other suitable server, which can be the result of the TITO server acting on the emulated request. The specific ticket data can then be routed to the appropriate printer at process step 1114, which printer can be located at an eTable, for example. Also, an indication can be provided to a live dealer at the eTable that a tip is occurring at process step 1116, if applicable.

At a following process step 1118, a payout confirmation can be received from the printer to which the specific ticket data was routed. This can indicated that a physical cash voucher was issued by the printer according to the specific ticket data. Again, this can have taken place at a suitable eTable. Data specific to the payout can then be stored to a local database at process step 1120, which can be a local database that is associated with the remote print server. A payout confirmation can then be sent to the requesting EGT at process step 1122, such that the player at the requesting EGT can be notified that the payout was received. Again, this can simply reflect that a desired tip has been provided from the player to a live human dealer at a remotely located eTable. The method then ends at end step 1124.

Again, the device functioning as a gaming terminal can be a third party device, such as that which is owned by the player or associate, or can be a device that is owned or operated by the casino or other host establishment. Such a device can be a portable device, or any other suitable electronic device. Suitable modules, apps, programs, and/or other components can be used to facilitate such use, which can include verification and debiting capabilities with respect to a player balance on his or her separate third party device.

For the foregoing flowcharts and methods, it will be readily appreciated that not every method step provided is always necessary, and that further steps not set forth herein may also be included. For example, added steps may involve code generation, error detection, and alert provisions. Also, further steps to involve player tracking and recordation of data may be added. Furthermore, the exact order of steps may be altered as desired, and some steps may be performed simultaneously.

It should be understood that the devices, systems and methods described herein may be adapted and configured to function independently or may also interact with other systems or applications, such as for example, a casino management system or player tracking system. As such, tipping or other partial payout data may be recorded and stored in connection with player information retrieved from a gaming terminal. It should also be readily apparent that additional computerized or manual systems may also be employed in accordance with the disclosure in order to achieve its full implementation as a system, apparatus or method.

Those skilled in the art will readily appreciate that any of the systems and methods of the disclosure may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as an existing electronic gaming machine, portable computing device or electronic platforms with multiple player positions. In addition, the system of the disclosure may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the disclosure so long as players and operators thereof are provided with useful access thereto or the opportunity to play the game as described herein.

The various aspects, embodiments, implementations or features of the described embodiments can be used separately or in any combination. Various aspects of the described embodiments can be implemented by software, hardware or a combination of hardware and software. Computer readable medium can be any data storage device that can store data which can thereafter be read by a computer system. Examples of computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A gaming table system comprising:
   a plurality of electronic gaming tables configured to provide a plurality of wager-based table games, wherein each of the plurality of electronic gaming tables includes:
      a physical surface configured to enable a play of at least one of the wager-based table games in association with one or more physical game components,
      a table controller configured to control a plurality of electronic gaming table functions,
      a printer coupled to the table controller and configured to issue cash vouchers at the electronic gaming table, and
      a table communication interface configured to facilitate communications between the table controller and one or more external system components;
   a plurality of gaming terminals configured to facilitate the play of the wager-based table games at the plurality of electronic gaming tables, wherein each of the plurality of gaming terminals includes:
      a gaming terminal controller configured to facilitate the play of the wager-based table games by a player,
      one or more display components coupled to the gaming terminal controller and configured to provide an output to the player regarding the play of the wager-based table games,
      a user interface configured to receive an input that initiates a remote monetary payout request, and
      a gaming terminal communication interface configured to facilitate communications between the gaming terminal controller and the one or more external system components; and
   a remote print server separate from and in communication with each of at least a first electronic gaming table of the plurality of electronic gaming tables and at least a first gaming terminal of the plurality of gaming terminals, the first gaming terminal being located remotely from the first electronic gaming table, wherein the remote print server is configured to route the remote monetary payout request from the first gaming terminal to the printer of the first electronic gaming table and cause the printer of the first electronic gaming table to issue a cash voucher at the first electronic gaming table.

2. The gaming table system of claim 1, wherein the remote monetary payout request represents a partial payout of a credit balance at the first gaming terminal, the remote monetary payout request comprising a partial monetary value that is less than a full monetary value of the credit balance.

3. The gaming table system of claim 2, wherein the remote print server is further configured to facilitate debiting the partial monetary value from the full monetary value at the first gaming terminal.

4. The gaming table system of claim 2, wherein the partial monetary value represents a tip amount.

5. The gaming table system of claim 4, wherein the tip amount is for a live human dealer at the first electronic gaming table.

6. The gaming table system of claim 5, wherein every tip amount provided to the live human dealer is printed to a separate cash voucher.

7. The gaming table system of claim 1, wherein each of the plurality of gaming tables further comprises
   a dealer station having at least a separate dealer display and a separate dealer input device configured for use by a live human dealer, wherein the separate dealer display is configured to display information to the live human dealer regarding the remote monetary payout request.

8. The gaming table system of claim 1, further comprising
   a cash voucher server in communication with the remote print server, wherein the remote print server is configured to communicate with the cash voucher server to obtain authorization and voucher data for the remote monetary payout request.

9. The gaming table system of claim 8, wherein the cash voucher server comprises a ticket in-ticket out server, and wherein the remote print server is configured to emulate an electronic gaming terminal that is eligible to receive a cash voucher authorization and data from the ticket in-ticket out server.

10. A remote print server comprising:
   a communication interface configured to facilitate communications between the remote print server and at least a first electronic gaming table and a first gaming terminal, wherein the first electronic gaming table includes a physical surface configured to enable a play of at least one of a plurality of wager-based table games in association with one or more physical game components, and the first gaming terminal is located remotely from the first electronic gaming table; and
   a processor coupled to the communication interface and configured to:
      receive a remote monetary payout request from the first gaming terminal, wherein the remote monetary payout request represents a partial payout of a credit balance at the first gaming terminal, the remote monetary payout request comprising a partial monetary value that is less than a full monetary value of the credit balance,
      facilitate a debiting of the partial monetary value from the full monetary value at the first gaming terminal, and route the remote monetary payout request from the first gaming terminal to a printer at the first electronic gaming table, wherein receipt of the remote monetary payout request results in the printer issuing a cash voucher corresponding to the partial monetary value.

11. The remote print server of claim 10, wherein the partial monetary value represents a tip amount for a live human dealer.

12. The remote print server of claim 11, wherein the processor is further configured to
communicate with a cash voucher server to obtain authorization and voucher data for the remote monetary payout request.

13. The gaming table system of claim 12, wherein the cash voucher server comprises a ticket in-ticket out server, and wherein the remote print server is further configured to
emulate an electronic gaming terminal that is eligible to receive a cash voucher authorization and data from the ticket in-ticket out server.

14. A method of providing a partial payout for an electronic player terminal configured to facilitate a play of at least one of a plurality of wager-based table games at a remotely located gaming table, the method comprising:
receiving a remote monetary payout request from the electronic gaming terminal, wherein the remote monetary payout request represents a partial payout of a credit balance of the electronic gaming terminal, the remote monetary payout request comprising a partial monetary value that is less than a full monetary value of the credit balance;
facilitating a debit of the partial monetary value from the full monetary value of the electronic gaming terminal; and
routing the remote monetary payout request from the electronic gaming terminal to a printer at the remotely located gaming table, wherein receipt of the remote monetary payout request results in the printer issuing a cash voucher corresponding to the partial monetary value.

15. The method of claim 14, wherein the partial monetary value represents a tip amount for a live human dealer.

16. The method of claim 14, further comprising:
emulating an electronic gaming terminal that is eligible to receive a cash voucher authorization and data from a ticket in-ticket out server; and
communicating with the ticket in-ticket out server to obtain an authorization and voucher data for the remote monetary payout request.

17. A gaming terminal comprising:
a display device;
an input device;
a communication interface;
a processor; and
a memory device which stores a plurality of instructions, which when executed by the processor, cause the processor to:
enable a player to place, via the input device, a wager on at least one of a plurality of wager-based table games at a plurality of gaming tables, wherein each of the plurality of gaming tables includes a printer configured to issue a cash voucher at the gaming table and a physical surface configured to enable a play of at least one of the wager-based table games in association with one or more physical game components,
cause the display device to display the wagered on play of the wager-based table game,
enable the player to make an input, via the input device, that initiates a remote monetary payout request associated with a first one of the gaming tables located remote from the gaming terminal, and
responsive to the player making the input that initiates the remote monetary payout request associated with the first one of the gaming tables, communicate, via the communication interface, data to a remote print server which routes the remote monetary payout request to the printer of the first gaming table and causes the printer of the first gaming table to issue a cash voucher at the first gaming table.

18. The gaming terminal of claim 17, wherein the remote monetary payout request represents a partial payout of a credit balance of the gaming terminal, the remote monetary payout request comprising a partial monetary value that is less than a full monetary value of the credit balance.

19. The gaming terminal of claim 18, wherein the remote print server further facilitates a debiting of the partial monetary value from the full monetary value at the gaming terminal.

* * * * *